United States Patent
Matsuba

(10) Patent No.: US 12,554,178 B2
(45) Date of Patent: Feb. 17, 2026

(54) OPTICAL SYSTEM AND APPARATUS HAVING THE SAME

(71) Applicant: CANON KABUSHIKI KAISHA, Tokyo (JP)

(72) Inventor: Yuki Matsuba, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 433 days.

(21) Appl. No.: 18/299,615

(22) Filed: Apr. 12, 2023

(65) Prior Publication Data

US 2023/0350271 A1 Nov. 2, 2023

(30) Foreign Application Priority Data

Apr. 27, 2022 (JP) ................. 2022-073276

(51) Int. Cl.
*G03B 5/04* (2021.01)
*G02B 15/14* (2006.01)

(52) U.S. Cl.
CPC ........ *G03B 5/04* (2013.01); *G02B 15/143103* (2019.08)

(58) Field of Classification Search
CPC .... G03B 5/04; G02B 15/144; G02B 15/1441; G02B 15/144107; G02B 15/1445; G02B 15/144507; G02B 15/145; G02B 15/1451; G02B 15/1455; G02B 15/146; G02B 15/1461; G02B 15/1465; G02B 15/167; G02B 15/24
See application file for complete search history.

(56) References Cited

U.S. PATENT DOCUMENTS

| | | | |
|---|---|---|---|
| 2019/0149727 A1* | 5/2019 | Mori | H04N 23/55 348/222.1 |
| 2020/0233191 A1* | 7/2020 | Ichimura | G02B 15/1461 |
| 2022/0155653 A1* | 5/2022 | Matsuba | G02B 27/0068 |
| 2022/0326486 A1* | 10/2022 | Chang | G02B 15/04 |
| 2023/0052715 A1* | 2/2023 | Kawamura | G02B 15/167 |
| 2024/0201475 A1* | 6/2024 | Ohtake | G02B 13/18 |

FOREIGN PATENT DOCUMENTS

JP 2019090952 A 6/2019

* cited by examiner

*Primary Examiner* — Ricky L Mack
*Assistant Examiner* — Natasha Nigam
(74) *Attorney, Agent, or Firm* — Canon U.S.A., Inc. IP Division

(57) ABSTRACT

An optical system configured to perform tilt image-capturing includes an object-side lens unit, a first lens unit having a positive refractive power, a second lens unit having a positive refractive power, and a third lens unit having a negative refractive power which are arranged in order from an object side. The first lens unit and the third lens unit move in a direction including a component of a direction perpendicular to an optical axis for tilt image-capturing. The object-side lens unit and the second lens unit do not move in a direction including a component of a direction perpendicular to the optical axis for tilt image-capturing.

20 Claims, 27 Drawing Sheets

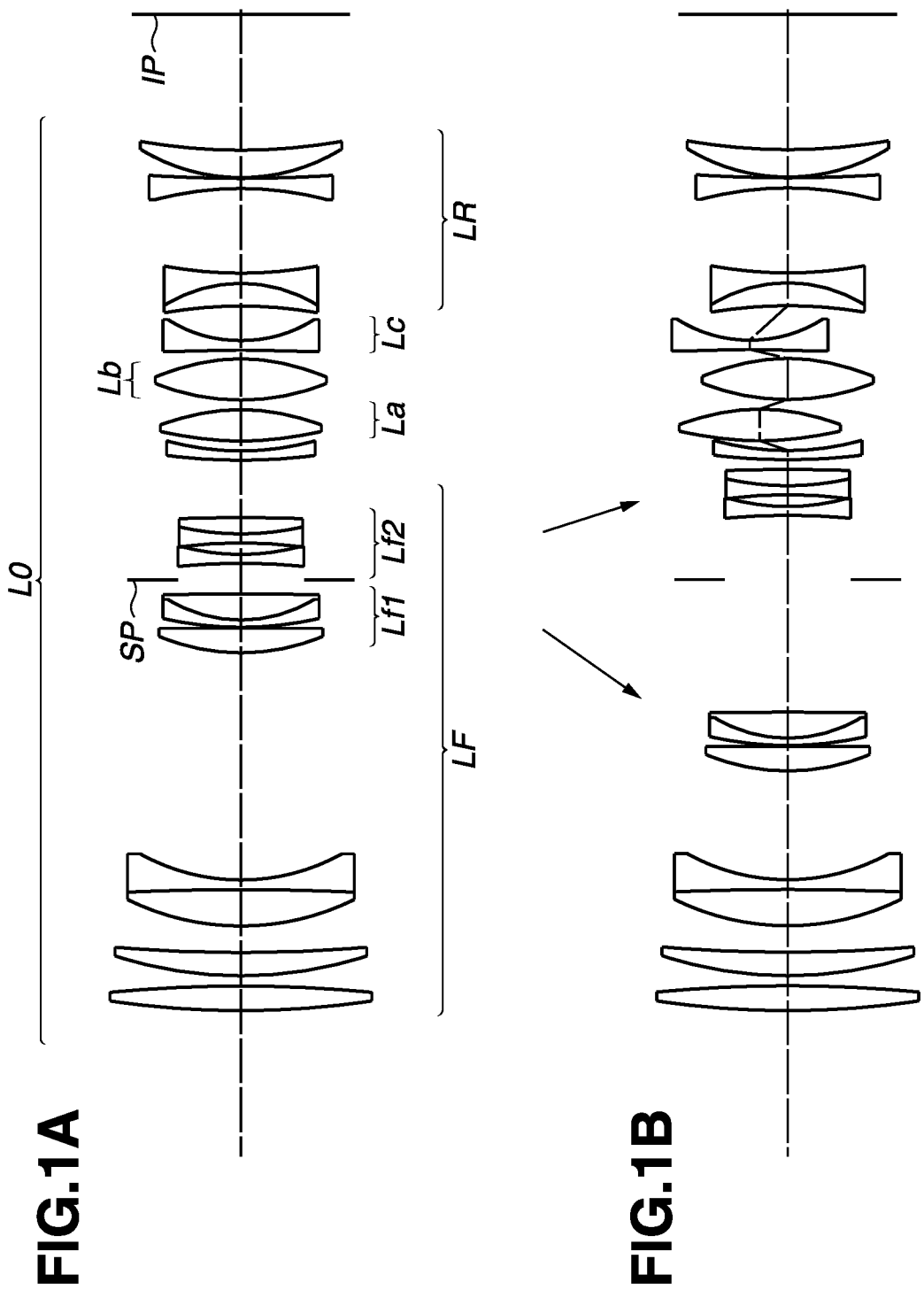

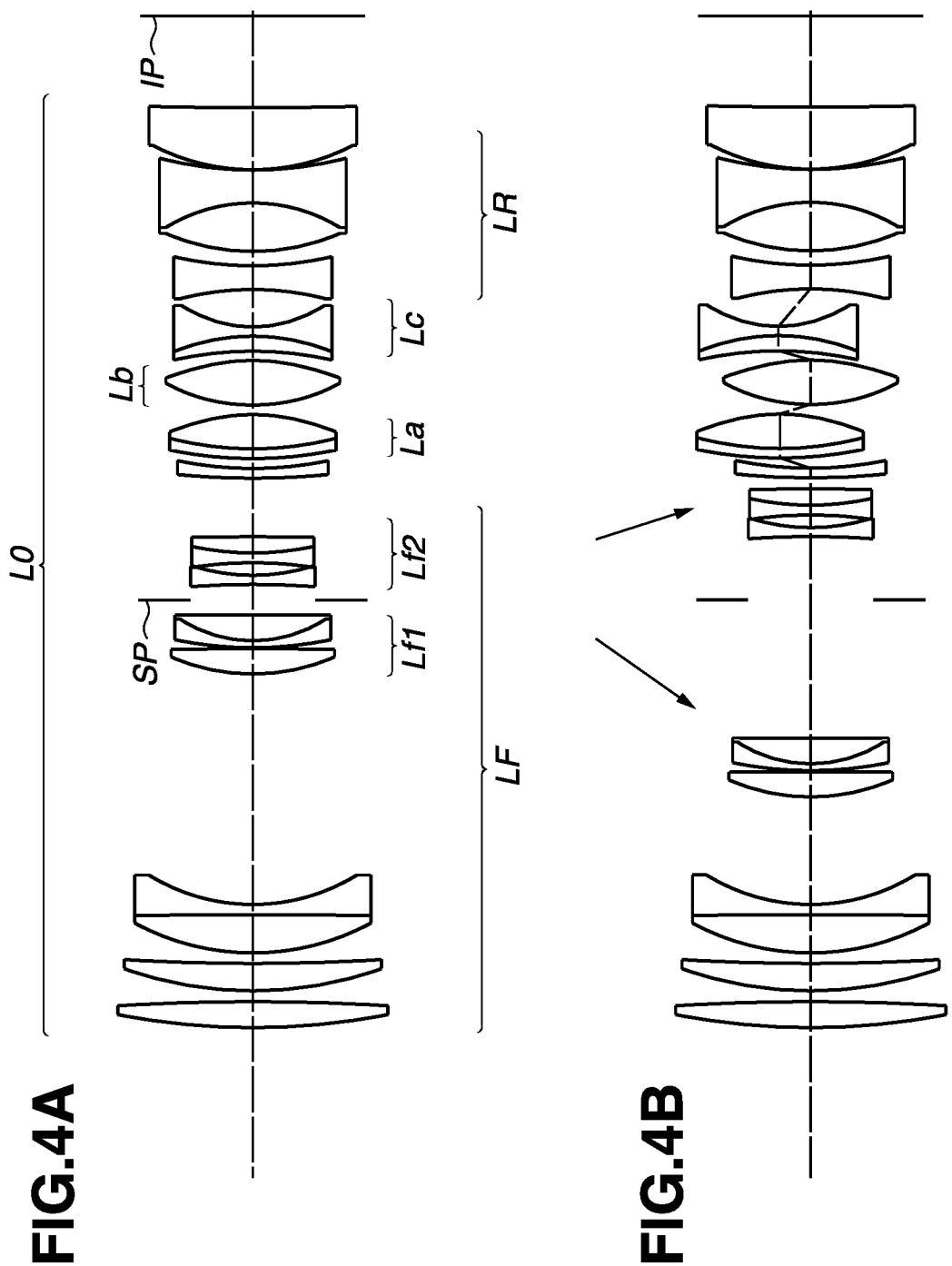

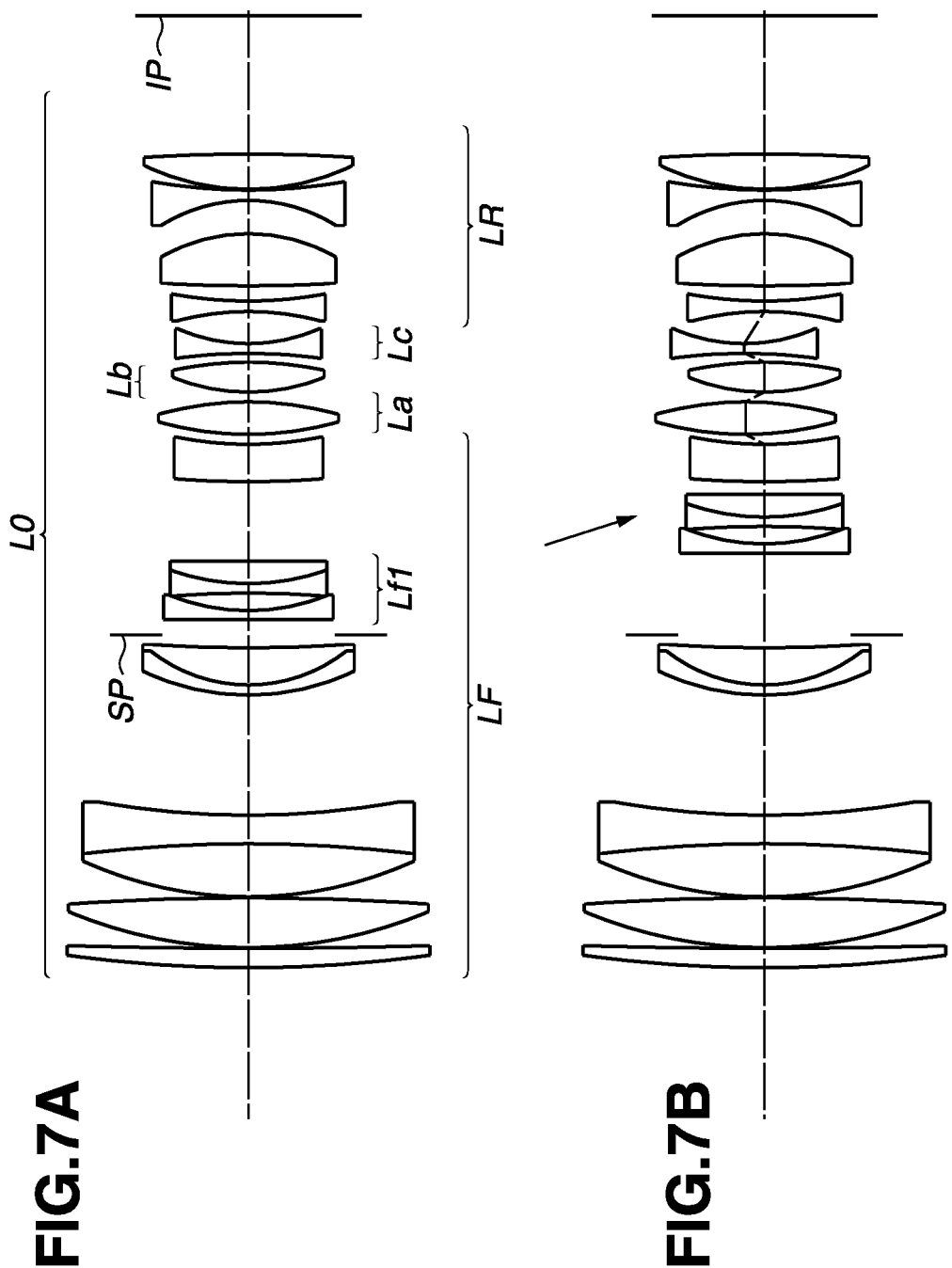

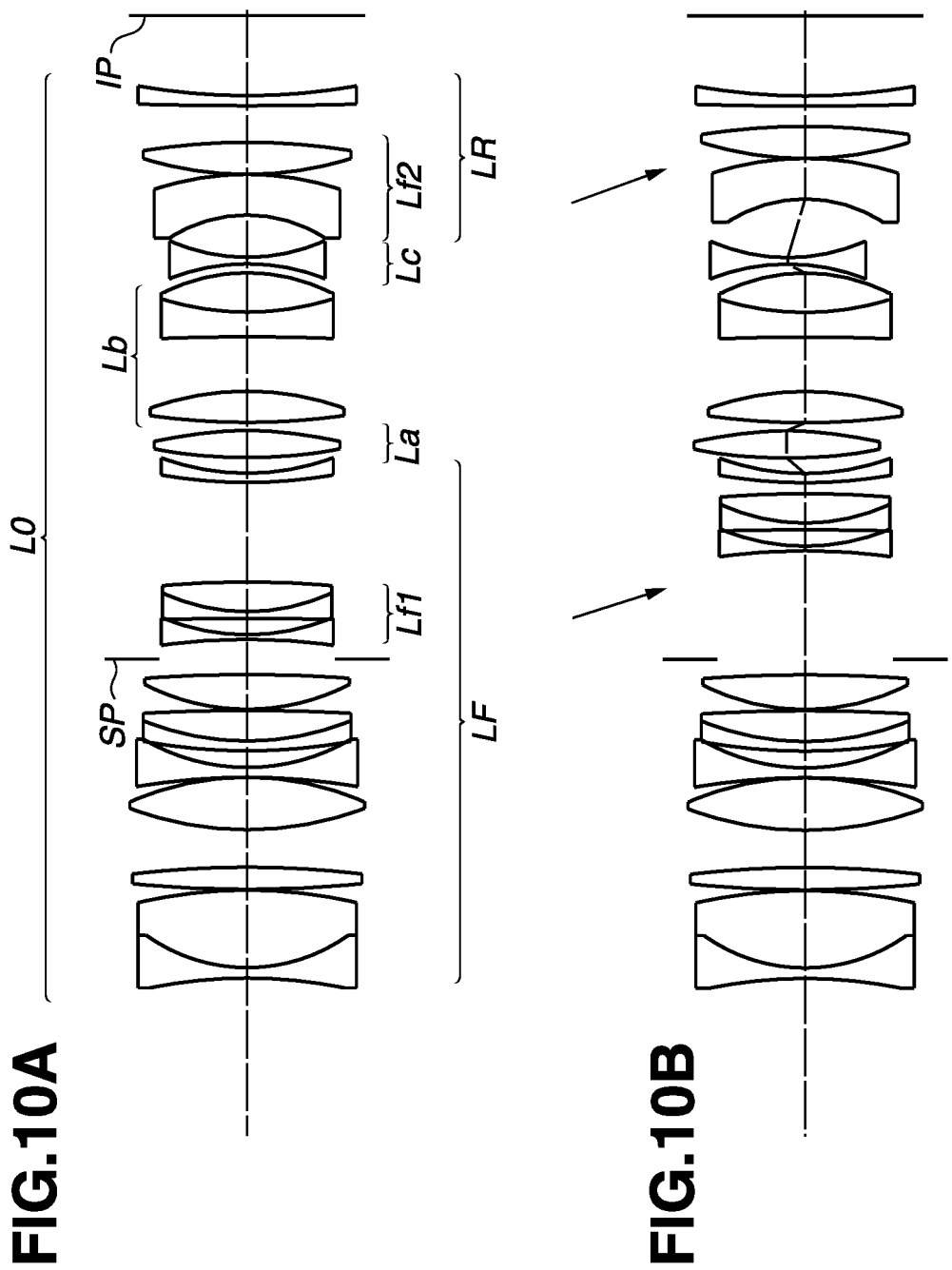

OPTICAL SYSTEM AND APPARATUS HAVING THE SAME

BACKGROUND

Technical Field

The aspect of the embodiments relates to an optical system and an apparatus having the optical system, and is suitable for an imaging apparatus using an image sensor, such as a video camera, an electronic still camera, a broadcast camera, and a monitoring camera.

Description of the Related Art

Capturing an image while focusing on an object plane inclined with respect to a direction perpendicular to an optical axis is referred to as tilt image-capturing.

In the tilt image-capturing, inclining an object plane on which focus is achieved to a great extent is demanded in order to broaden the range of image expressions.

As an optical system that implements this image-capturing, an imaging optical system having a tilt mechanism (a tilt-shift mechanism) is known.

Meanwhile, in the imaging optical system having the tilt mechanism, a composition can shift during tilt (hereinafter, such a shift is also referred to as "composition shift"), which impairs convenience.

Japanese Patent Application Laid-Open No. 2019-090952 discusses an imaging optical system provided with a plurality of lens units that moves in a direction perpendicular to an optical axis direction. In Japanese Patent Application Laid-Open No. 2019-090952, a lens unit A moves in a direction perpendicular to the optical axis direction, and a lens unit B moves in a direction perpendicular to the optical axis direction to correct a shift effect occurring in the lens unit A, during tilt image-capturing, so that tilt image-capturing with a small composition shift is performable.

The imaging optical system of Japanese Patent Application Laid-Open No. 2019-090952 moves the lens unit in the direction perpendicular to the optical axis direction during tilt image-capturing, and thus aberration due to optical decentering occurs. The amount of this aberration occurring due to the decentering increases, as the inclination amount of an object plane for performing tilt image-capturing increases. In Japanese Patent Application Laid-Open No. 2019-090952, the lens unit A that moves in the direction perpendicular to the optical axis direction has a negative refractive power, and thus the height from the optical axis of off-axis light to be incident on the lens unit B increases, and the amount of the decentering aberration occurring when the lens unit B is decentered increases. The height of the off-axis light from the optical axis increases, so that the diameter of the lens unit B increases. This makes it difficult to increase the decentering amount of the lens unit B, and as a result, it is difficult to incline an object plane on which focus is achieved.

SUMMARY

According to an aspect of the embodiments, an optical system configured to perform tilt image-capturing includes an object-side lens unit, a first lens unit having a positive refractive power, a second lens unit having a positive refractive power, and a third lens unit having a negative refractive power which are arranged in order from an object side. The first lens unit and the third lens unit move in a direction including a component of a direction perpendicular to an optical axis for tilt image-capturing. The object-side lens unit and the second lens unit do not move in a direction including a component of a direction perpendicular to the optical axis for tilt image-capturing.

Further features of the disclosure will become apparent from the following description of exemplary embodiments with reference to the attached drawings.

BRIEF DESCRIPTION OF THE DRAWINGS

FIG. 1A is a diagram illustrating a section of an optical system according to Example 1 at the time of normal image-capturing and infinite in-focus, and FIG. 1B is a section of the optical system according to Example 1 at the time of tilt image-capturing and finite distance in-focus.

FIG. 4A is a diagram illustrating a section of an optical system according to Example 2 at the time of normal image-capturing and infinite in-focus, and FIG. 4B is a section of the optical system according to Example 2 at the time of tilt image-capturing and finite distance in-focus.

FIG. 7A is a diagram illustrating a section of an optical system according to Example 3 at the time of normal image-capturing and infinite in-focus, and FIG. 7B is a section of the optical system according to Example 3 at the time of tilt image-capturing and finite distance in-focus.

FIG. 10A is a diagram illustrating a section of an optical system according to Example 4 at the time of normal image-capturing and infinite in-focus, and FIG. 10B is a section of the optical system according to Example 4 at the time of tilt image-capturing and finite distance in-focus in part (B).

DESCRIPTION OF THE EMBODIMENTS

Examples of the aspect of the embodiments will be described below with reference to the accompanying drawings.

In each of lens section diagrams, the left side is the object side (front) and the right side is the image side (rear). An optical system of each of Examples has a plurality of lens units.

A lens unit in the specification of the present application is a group of lenses which are decentered with respect to an optical axis at the time of tilt image-capturing, or a group of fixed lenses. The lens unit may consist of a single lens, or consist of a plurality of lenses. The lens unit may also include an aperture diaphragm.

FIGS. 1A, 4A, 7A, 10A, 13A, 16A, 19A, and 22A each illustrate a section of an optical system of Examples 1 to 8, respectively, at the time of normal image-capturing and infinite in-focus. FIGS. 1B, 4B, 7B, 10B, 13B, 16B, 19B, and 22B each illustrate a section of the optical system of Examples 1 to 8, respectively, at the time of tilt image-capturing when focus is achieved at a finite distance.

IP represents an image plane. When the optical system of each of the Examples is used as an image-capturing optical system of a digital still camera or a digital video camera, an imaging plane of a solid-state image sensor (photoelectric conversion element), such as a charge-coupled device (CCD) sensor and a complementary metal oxide semiconductor (CMOS) sensor, is disposed as the image plane IP. When the optical system of each of the Examples is used as an image-capturing optical system of a silver-halide film camera, a photosensitive surface corresponding to a film surface is disposed as the image plane IP.

FIGS. 2A, 5A, 8A, 11A, 14A, 17A, 20A, and 23A correspond to Examples 1 to 8, respectively, and each illustrate longitudinal aberration at the time of normal image-capturing and infinite in-focus, of the optical system in the corresponding Example. FIGS. 2B, 5B, 8B, 11B, 14B, 17B, 20B, and 23B correspond to Examples 1 to 8, respectively, and each illustrate longitudinal aberration at the time of tilt image-capturing when focus is achieved at a finite distance, of the optical system in the corresponding Example. Here, the time of normal image-capturing represents a state where the lens unit is not decentered.

In a spherical aberration diagram, a solid line indicates a d-line (wavelength 587.6 nm), and a two-dot chain line indicates a g-line (wavelength 435.8 nm). In an astigmatism diagram, a broken line M indicates a meridional image plane, and a solid line S indicates a sagittal image plane. A distortion aberration diagram indicates a distortion amount with respect to the d-line. A magnification chromatic aberration is represented by the g-line. Further, an image pickup half angle of view (degree) is denoted by ω, and an F-number is denoted by Fno.

Figure 2A:
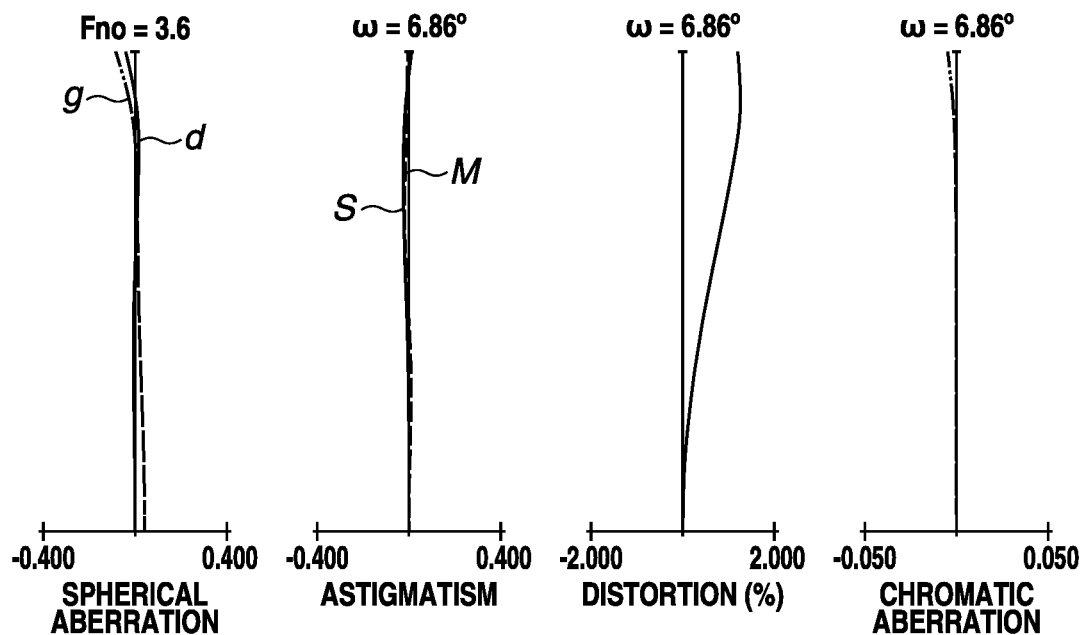
FIG. 2A is a diagram illustrating longitudinal aberration at the time of normal image-capturing and infinite in-focus.
Figure 2B:
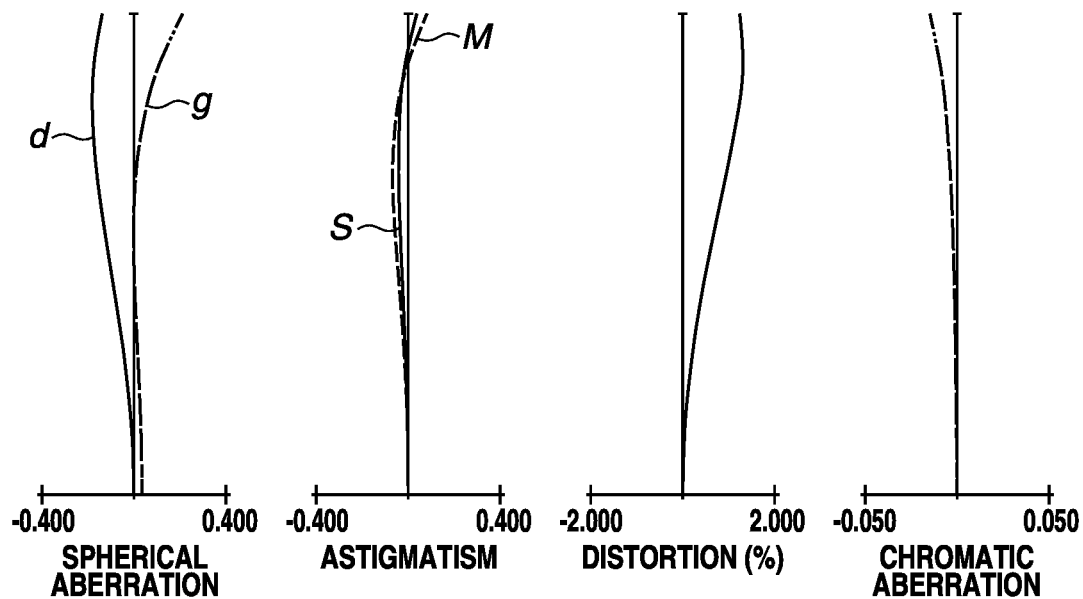
FIG. 2B is a diagram illustrating longitudinal aberration at the time of normal image-capturing and finite distance in-focus, for the optical system according to Example 1.
Figure 3A:
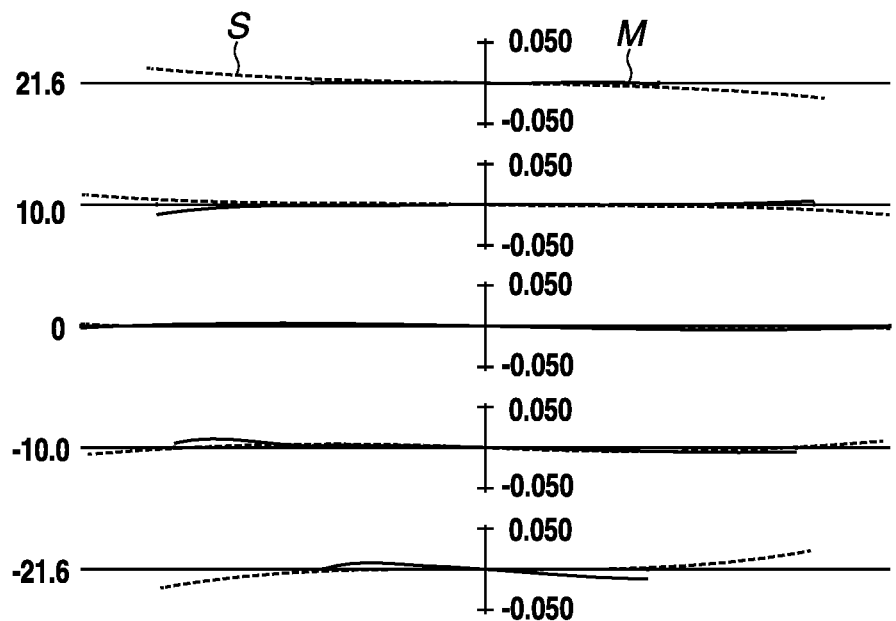
FIGS. 3A and 3B are diagrams each illustrating transverse aberration at the time of tilt image-capturing and finite distance in-focus, for the optical system according to Example 1.
Figure 3B:
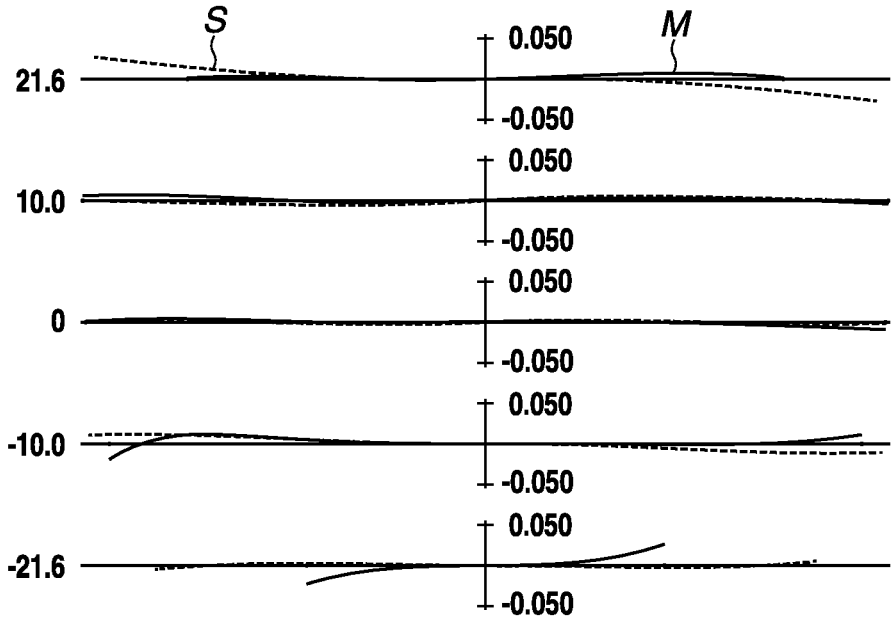
Figure 5A:
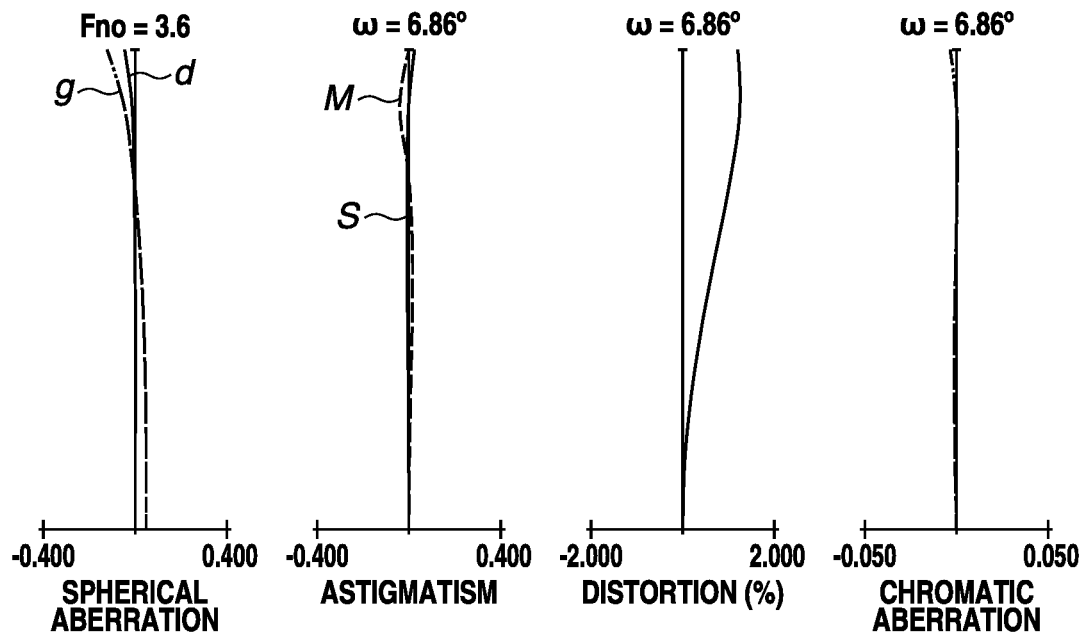
FIG. 5A is a diagram illustrating longitudinal aberration at the time of normal image-capturing and infinite in-focus.
Figure 5B:
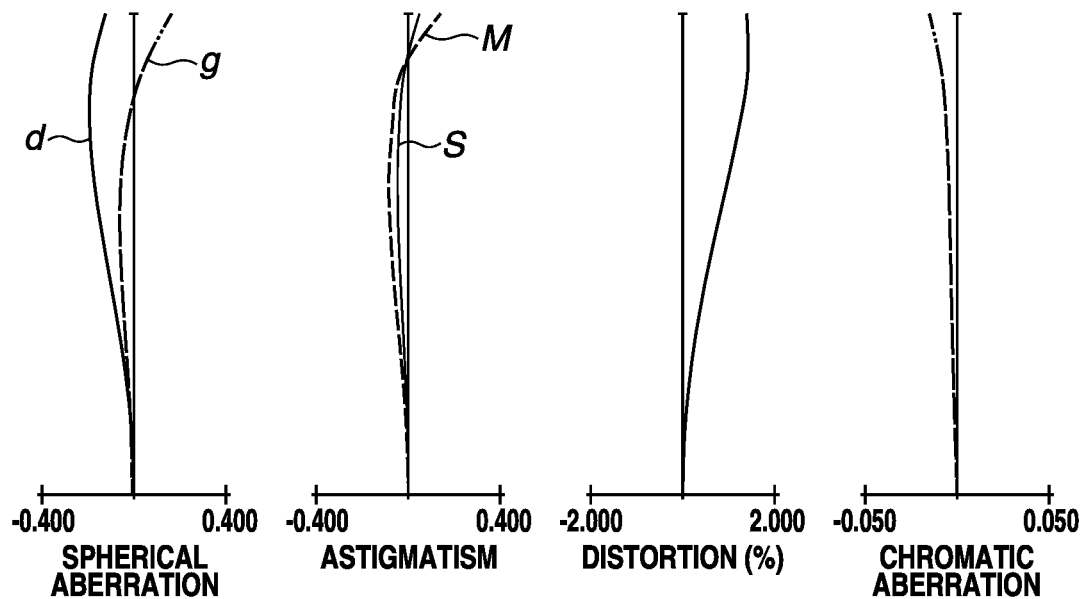
FIG. 5B is a diagram illustrating longitudinal aberration at the time of normal image-capturing and finite distance in-focus, for the optical system according to Example 2.
Figure 6A:
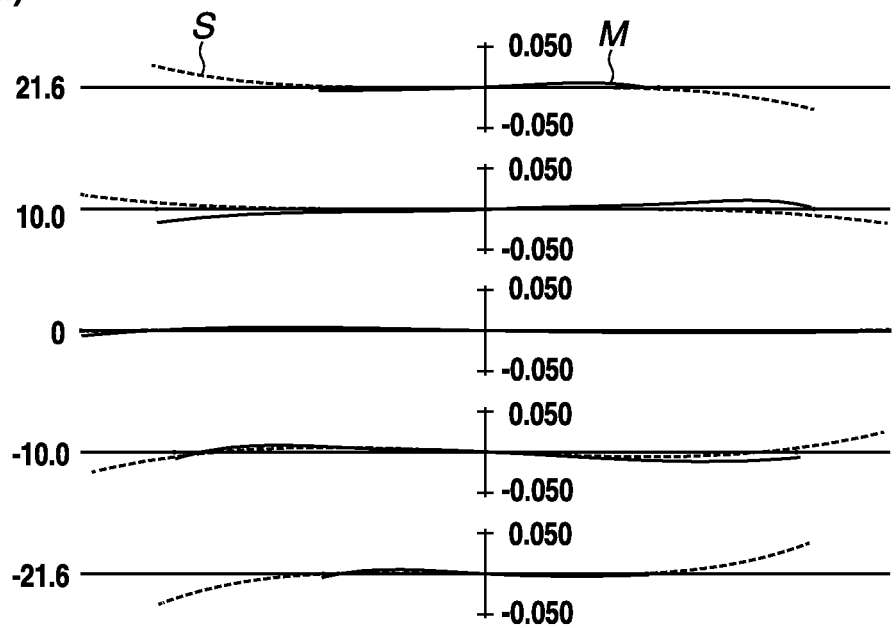
FIGS. 6A and 6B are diagrams each illustrating transverse aberration at the time of tilt image-capturing and finite distance in-focus of the optical system according to Example 2.
Figure 6B:
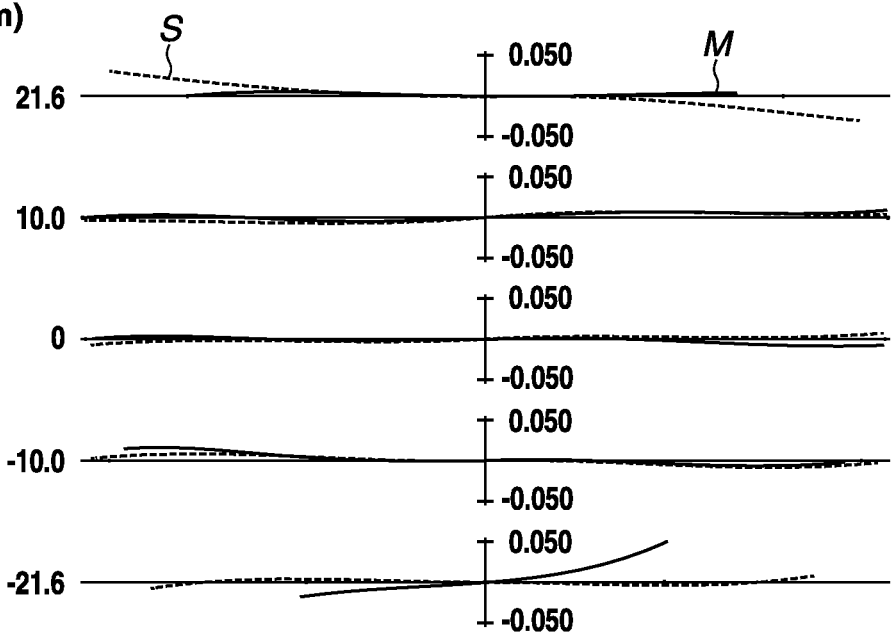
Figure 8A:
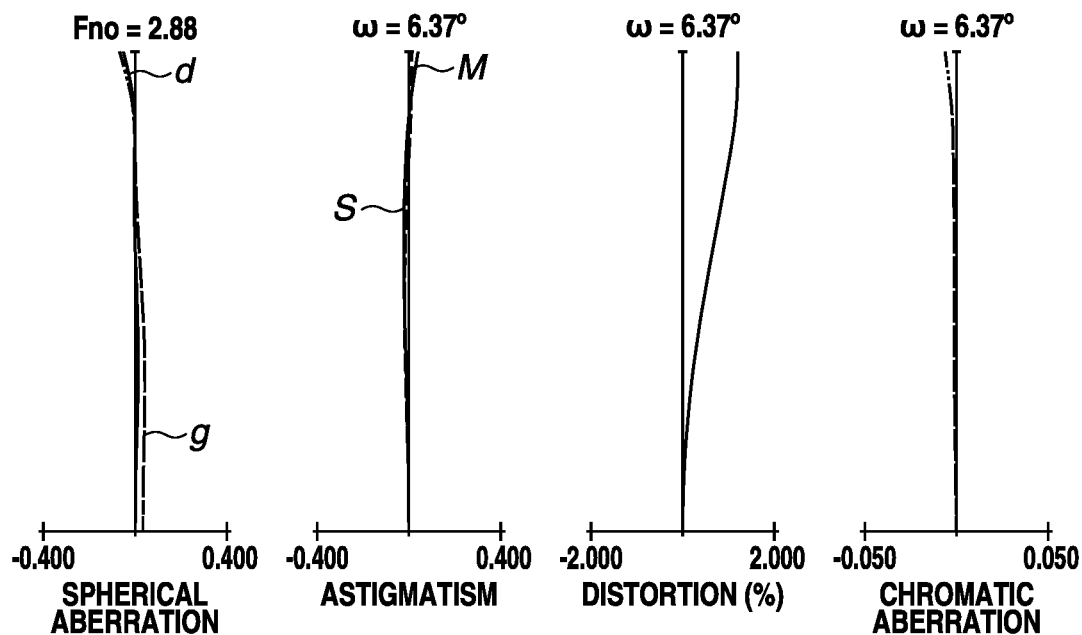
FIG. 8A is a diagram illustrating longitudinal aberration at the time of normal image-capturing and infinite in-focus.
Figure 8B:
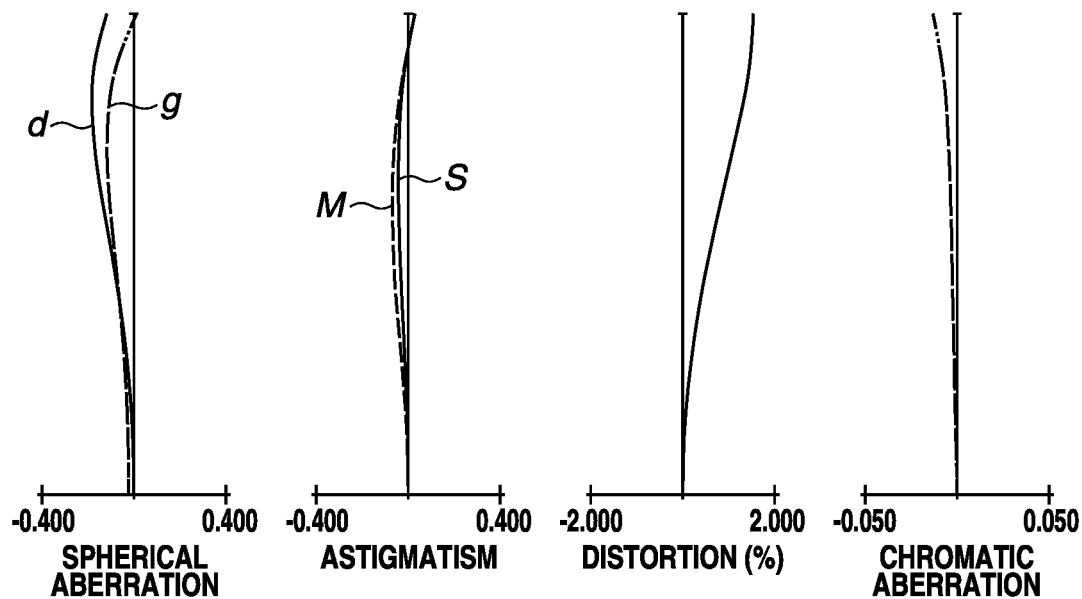
FIG. 8B is a diagram illustrating longitudinal aberration at the time of normal image-capturing and finite distance in-focus, for the optical system according to Example 3.

FIG. 3A is a transverse aberration diagram of Example 1 at the time of tilt image-capturing in a state where an object plane at a distance of about 9,000 mm away, on the optical axis, from a first surface is inclined at about 82 degrees with respect to a direction perpendicular to the optical axis of an imaging optical system. FIG. 3B is a transverse aberration diagram of Example 1 at the time of tilt image-capturing in a state where the object plane at a distance of about 212 mm away, on the optical axis, from the first surface is inclined at about 25 degrees with respect to the direction perpendicular to the optical axis of an imaging optical system. FIG. 6A is a transverse aberration diagram of Example 2 at the time of tilt image-capturing in a state where an object plane at a distance of about 9,000 mm away, on the optical axis, from a first surface is inclined at about 82 degrees with respect to a direction perpendicular to the optical axis of an imaging optical system. FIG. 6B is a transverse aberration diagram of Example 2 at the time of tilt image-capturing in a state where the object plane at a distance of about 212 mm away, on the optical axis, from the first surface is inclined at about 25 degrees with respect to the direction perpendicular to the optical axis of the imaging optical system.

Figure 9A:
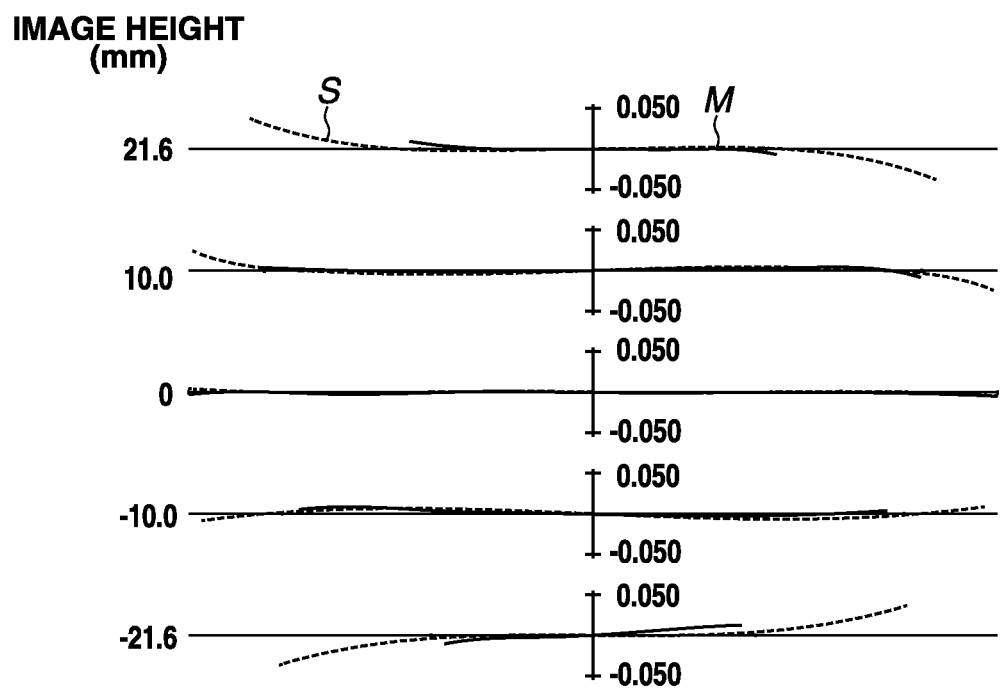
FIGS. 9A and 9B are diagrams each illustrating transverse aberration at the time of tilt image-capturing and finite distance in-focus, for the optical system according to Example 3.
Figure 9B:
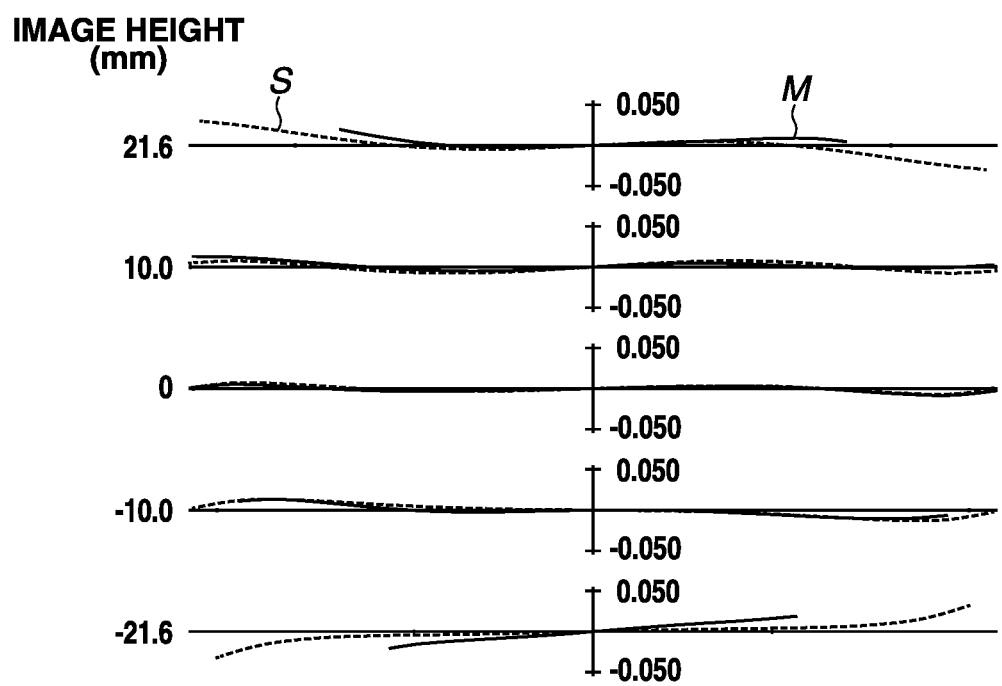
Figure 11A:
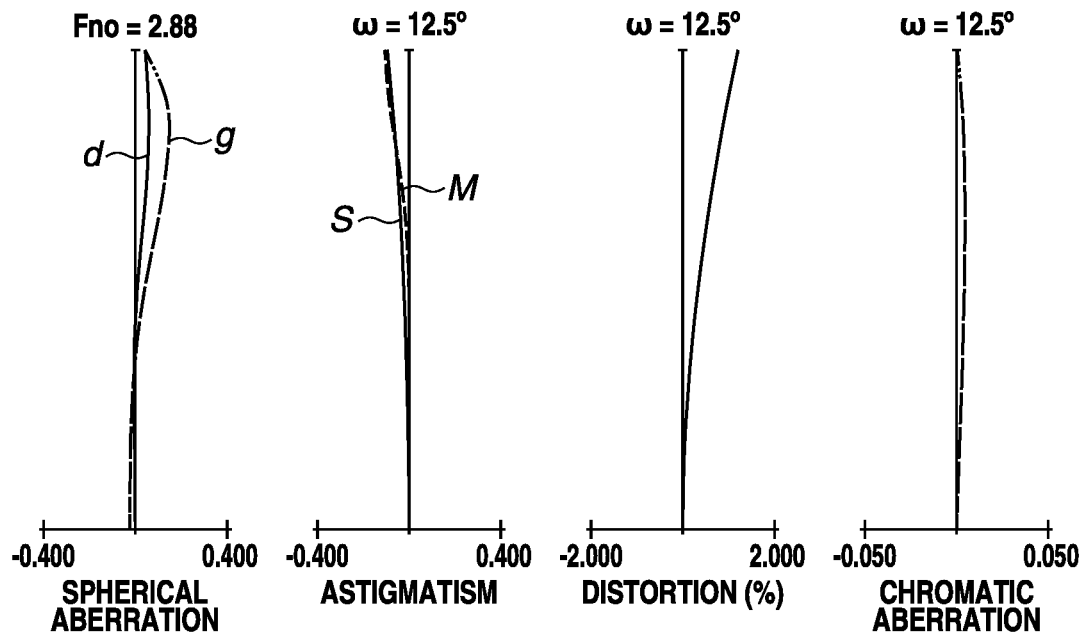
FIG. 11A is a diagram illustrating longitudinal aberration at the time of normal image-capturing and infinite in-focus.
Figure 11B:
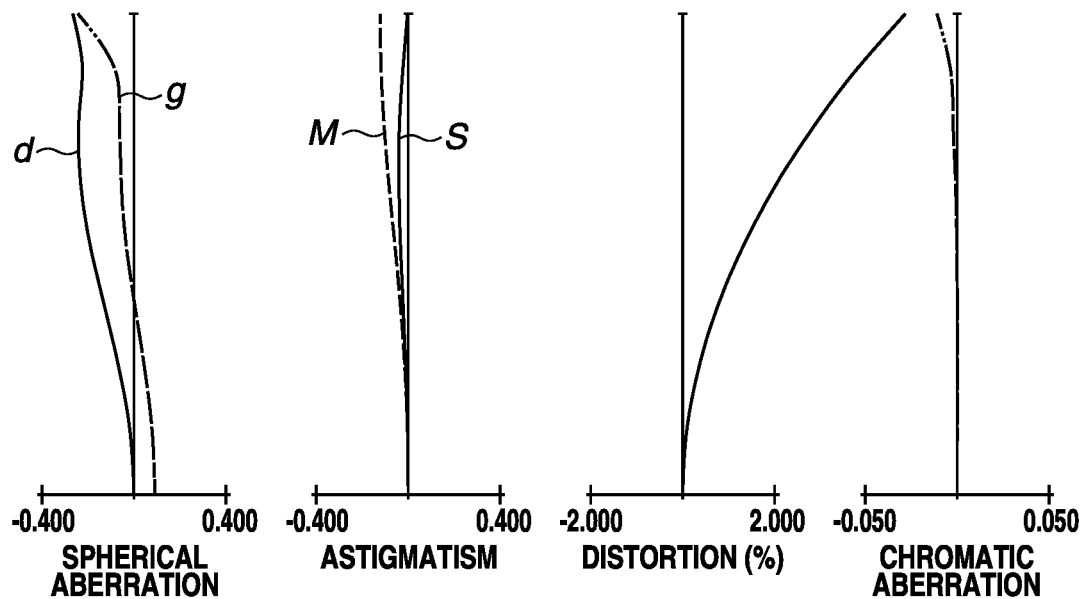
FIG. 11B is a diagram illustrating longitudinal aberration at the time of normal image-capturing and finite distance in-focus, for the optical system according to Example 4.
Figure 12A:
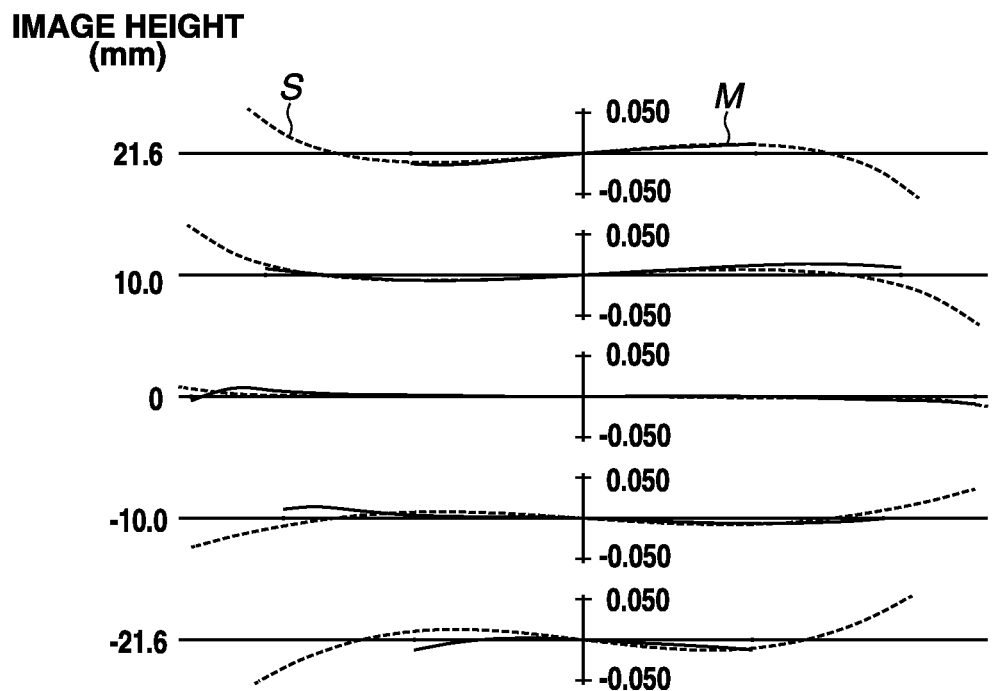
FIGS. 12A and 12B are diagrams each illustrating transverse aberration at the time of tilt image-capturing and finite distance in-focus, for the optical system according to Example 4.
Figure 12B:
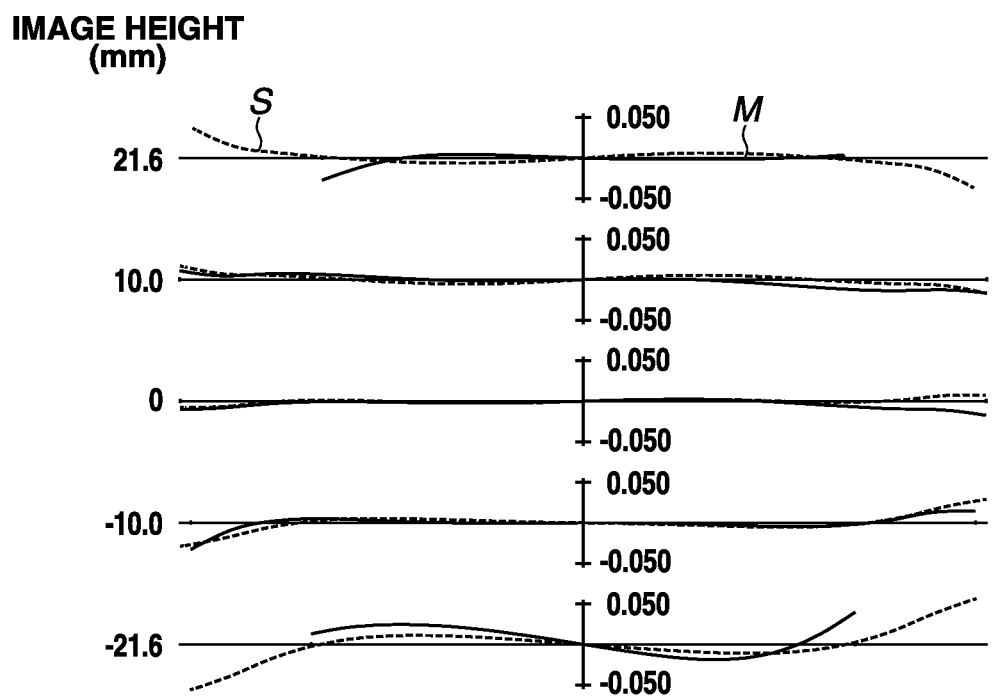
Figures 13A, 13B:
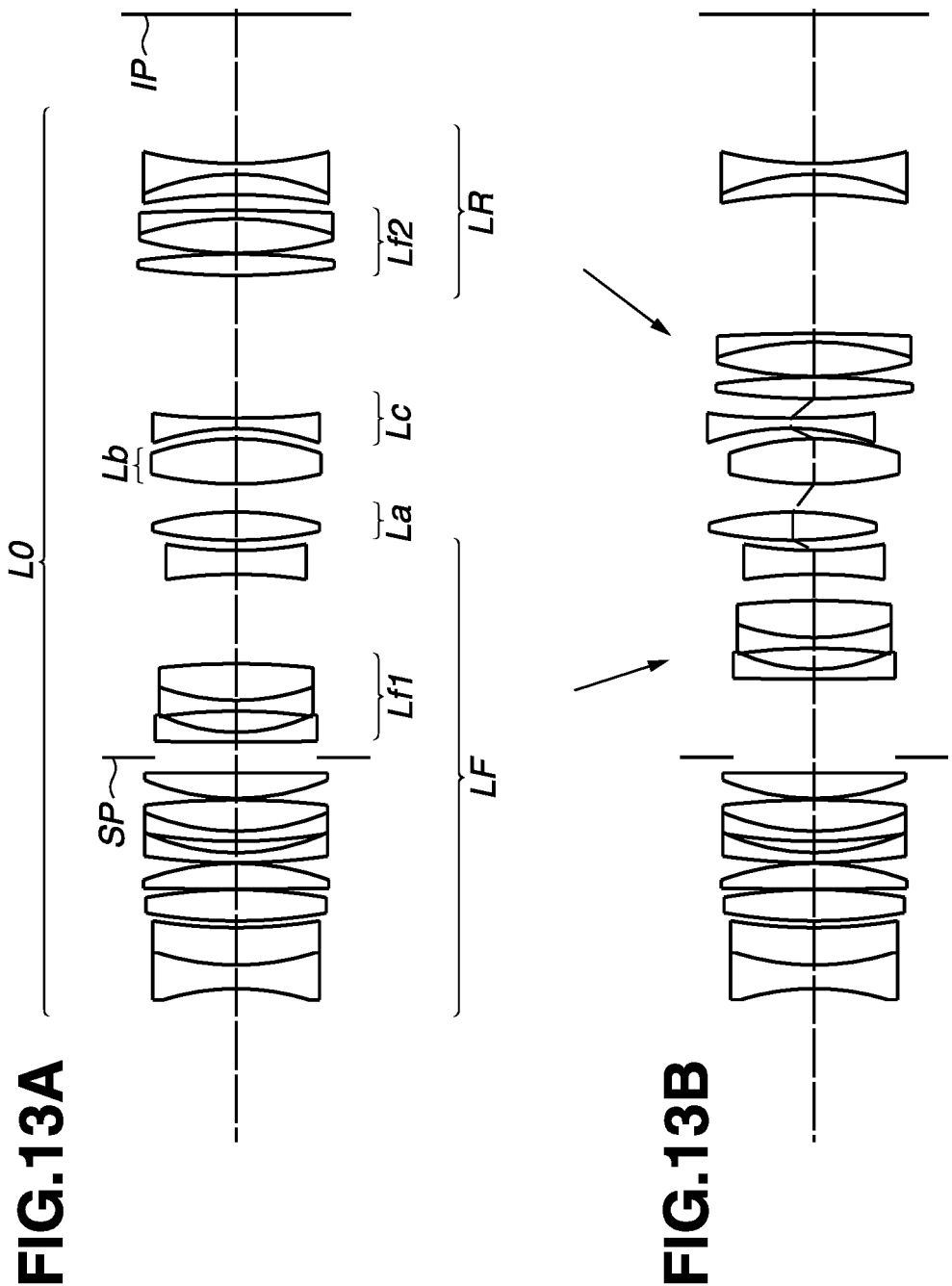
FIG. 13A is a diagram illustrating a section of an optical system according to Example 5 at the time of normal image-capturing and infinite in-focus.
FIG. 13B is a section of the optical system according to Example 5 at the time of tilt image-capturing and finite distance in-focus.
Figure 14A:
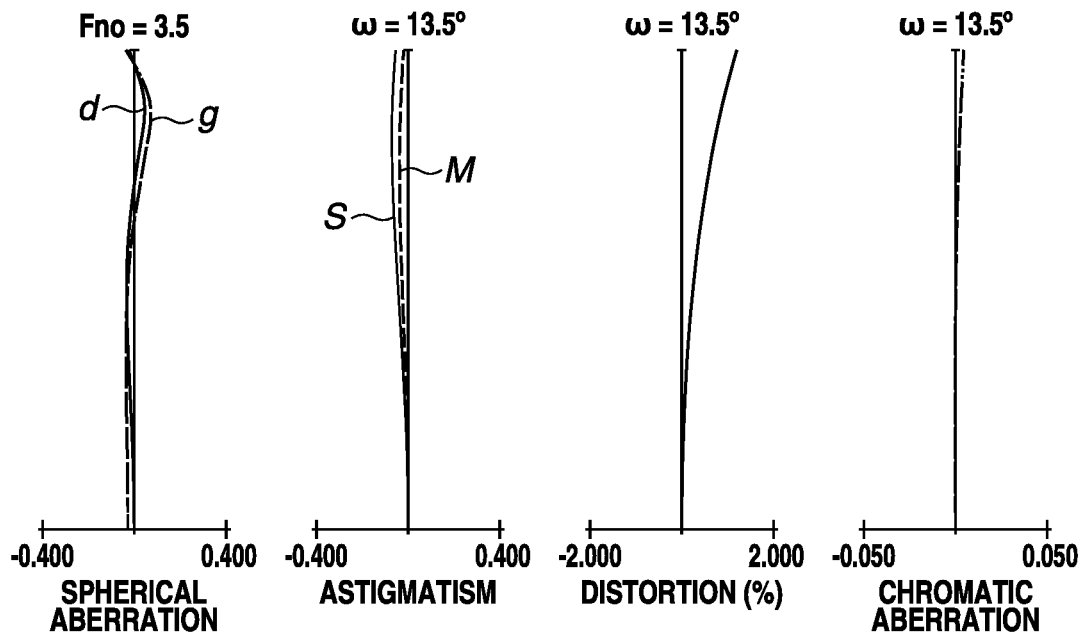
FIG. 14A is a diagram illustrating longitudinal aberration at the time of normal image-capturing and infinite in-focus.
Figure 14B:
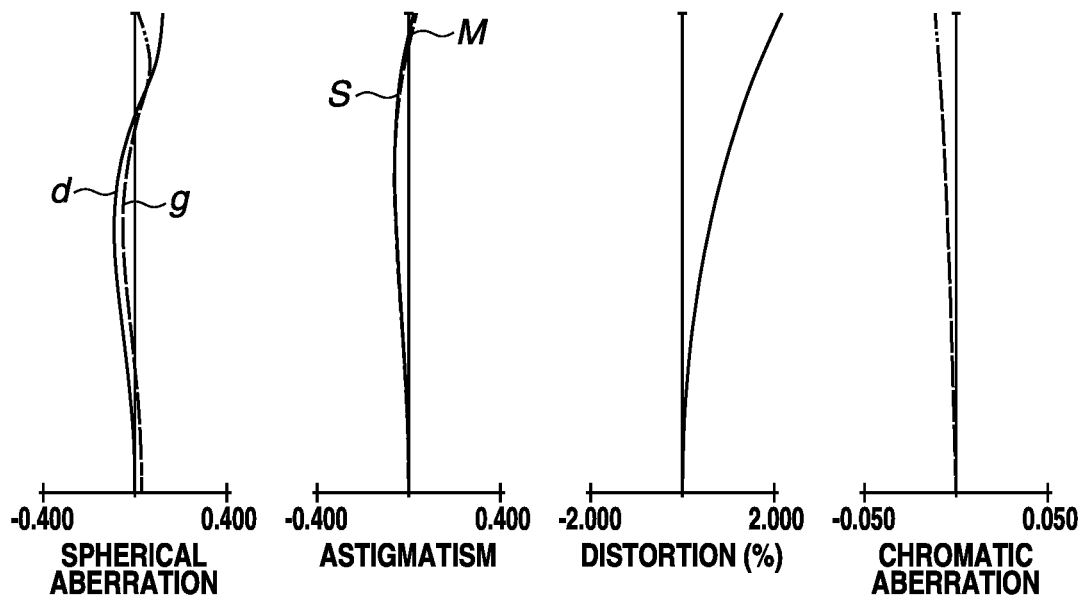
FIG. 14B is a diagram illustrating longitudinal aberration at the time of normal image-capturing and finite distance in-focus, for the optical system according to Example 5.

FIG. 9A is a transverse aberration diagram of Example 3 at the time of tilt image-capturing in a state where an object plane at a distance of about 9,000 mm away, on the optical axis, from a first surface is inclined at about 82 degrees with respect to a direction perpendicular to the optical axis of an imaging optical system. FIG. 9B is a transverse aberration diagram of Example 3 at the time of tilt image-capturing in a state where the object plane at a distance of about 595 mm away, on the optical axis, from the first surface is inclined at about 25 degrees with respect to the direction perpendicular to the optical axis of the imaging optical system. FIG. 12A is a transverse aberration diagram of Example 4 at the time of tilt image-capturing in a state where an object plane at a distance of about 5,000 mm away, on the optical axis, from a first surface is inclined at about 82 degrees with respect to a direction perpendicular to the optical axis of an imaging optical system. FIG. 12B is a transverse aberration diagram of Example 4 at the time of tilt image-capturing in a state where the object plane at a distance of about 109 mm away, on the optical axis, from the first surface is inclined at about 12 degrees with respect to the direction perpendicular to the optical axis of the imaging optical system.

Figure 15A:
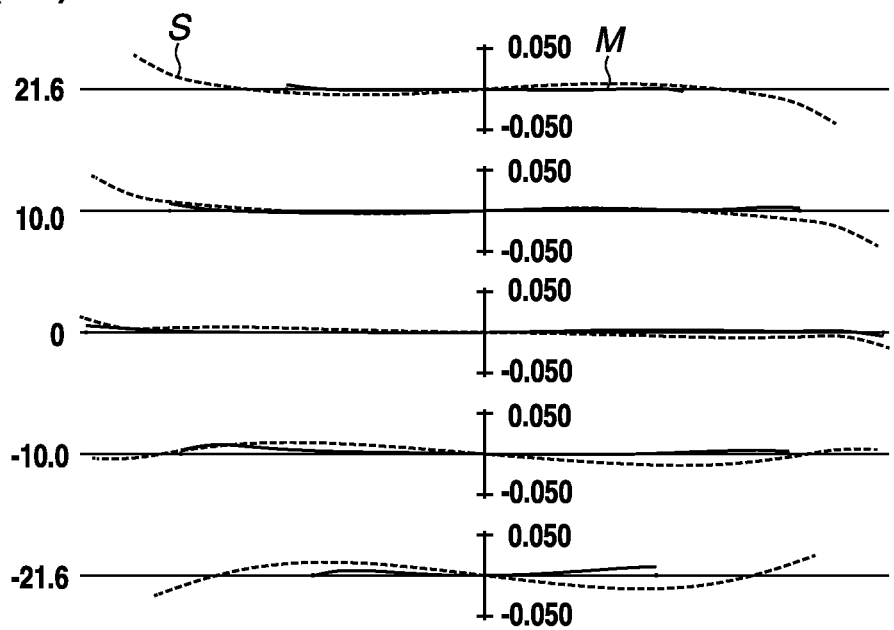
FIGS. 15A and 15B are diagrams each illustrating transverse aberration at the time of tilt image-capturing and finite distance in-focus of the optical system according to Example 5.
Figure 15B:
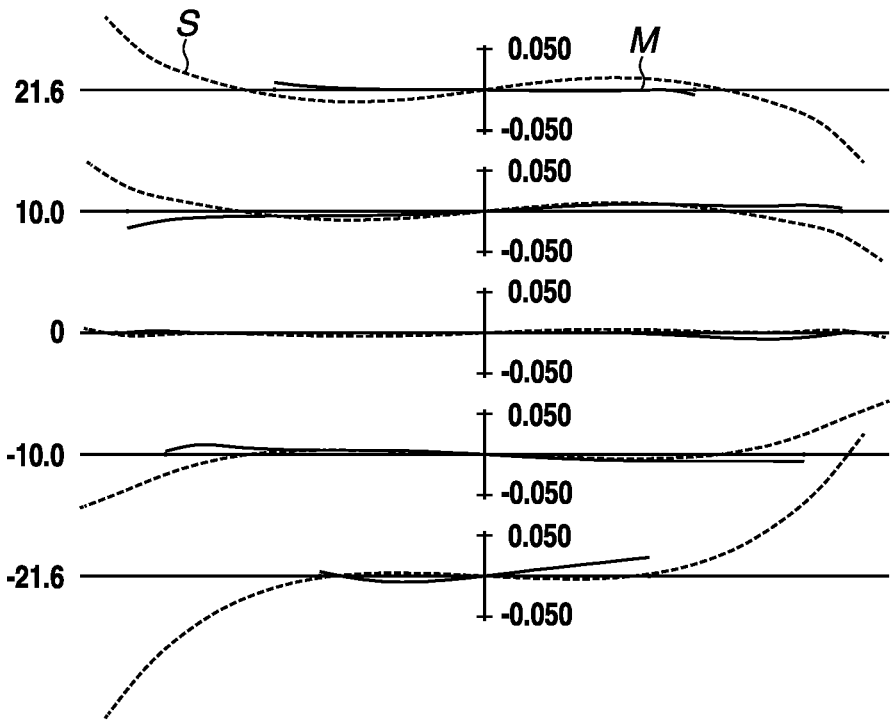
Figures 16A, 16B:
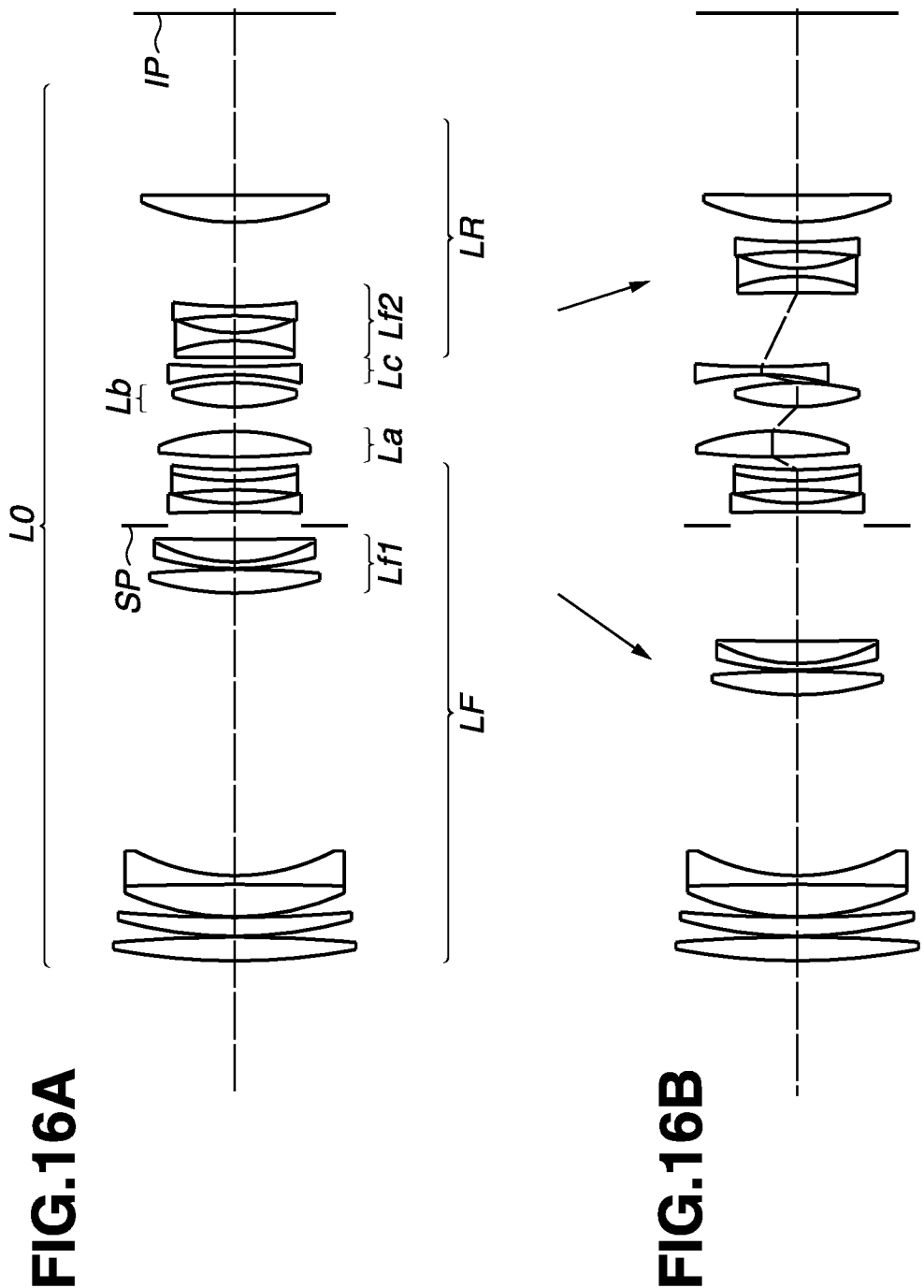
FIG. 16A is a diagram illustrating a section of an optical system according to Example 6 at the time of normal image-capturing and infinite in-focus.
FIG. 16B is a section of the optical system according to Example 6 at the time of tilt image-capturing and finite distance in-focus.
Figure 17A:
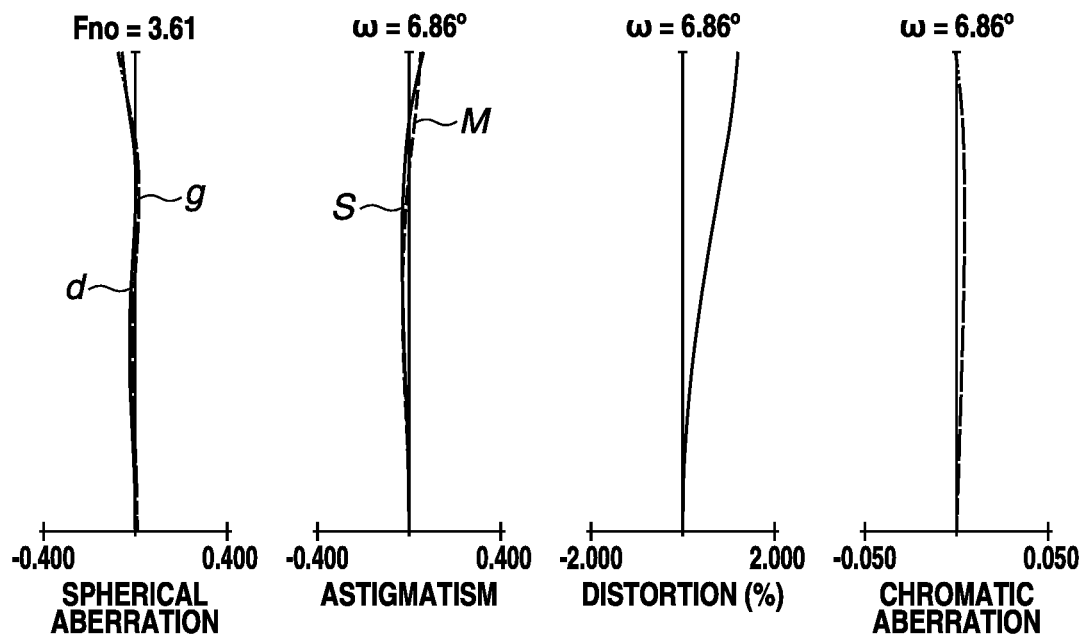
FIG. 17A is a diagram illustrating longitudinal aberration at the time of normal image-capturing and infinite in-focus.
Figure 17B:
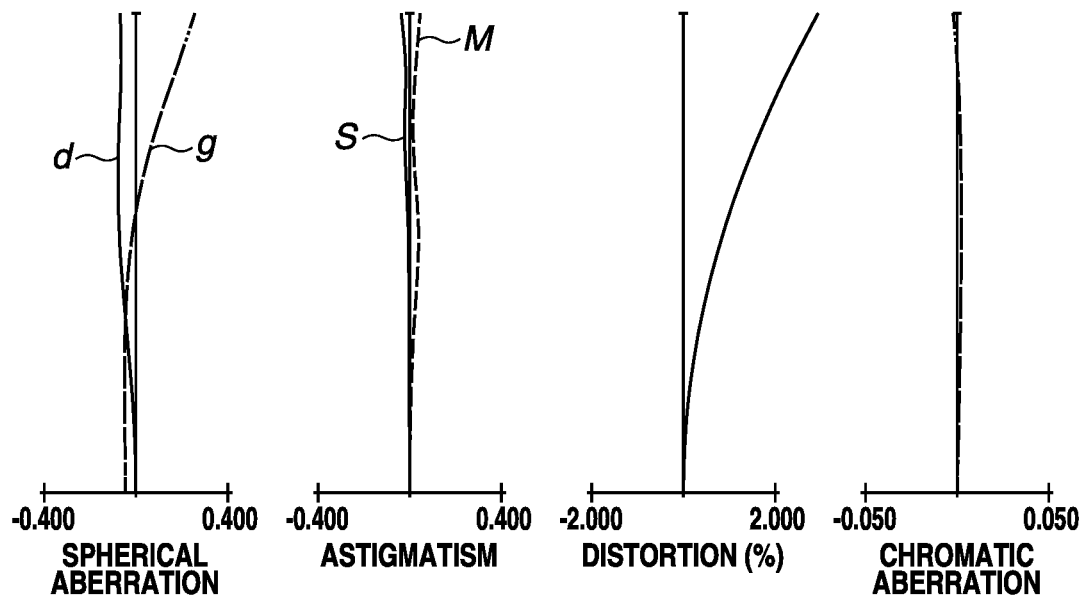
FIG. 17B is a diagram illustrating longitudinal aberration at the time of normal image-capturing and finite distance in-focus, for the optical system according to Example 6.
Figure 18A:
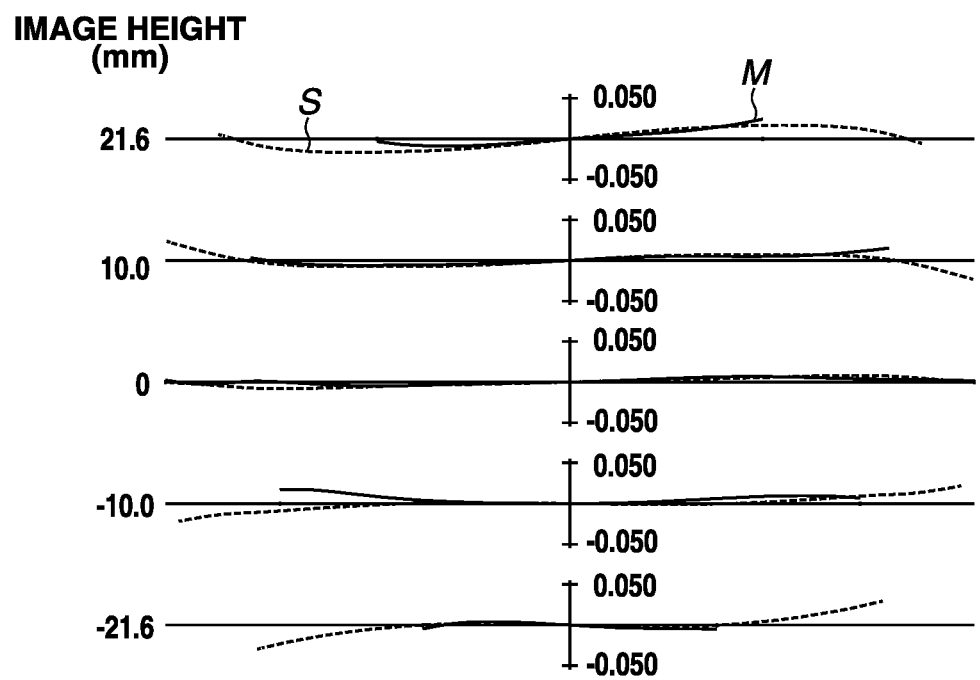
FIGS. 18A and 18B are diagrams each illustrating transverse aberration at the time of tilt image-capturing and finite distance in-focus, for the optical system according to Example 6.
Figure 18B:
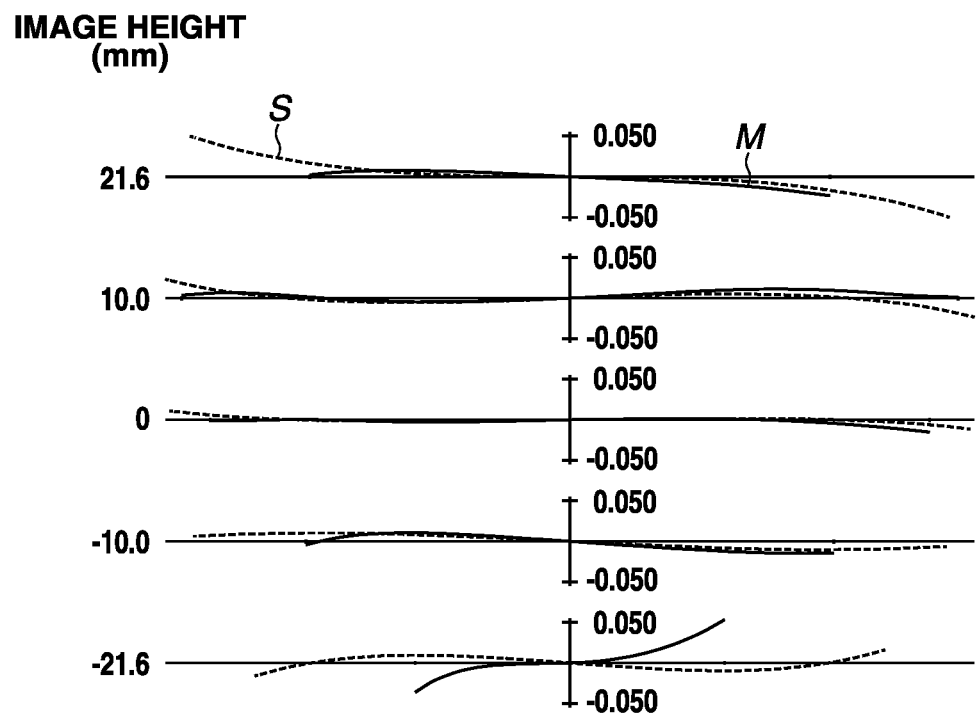
Figures 19A, 19B:
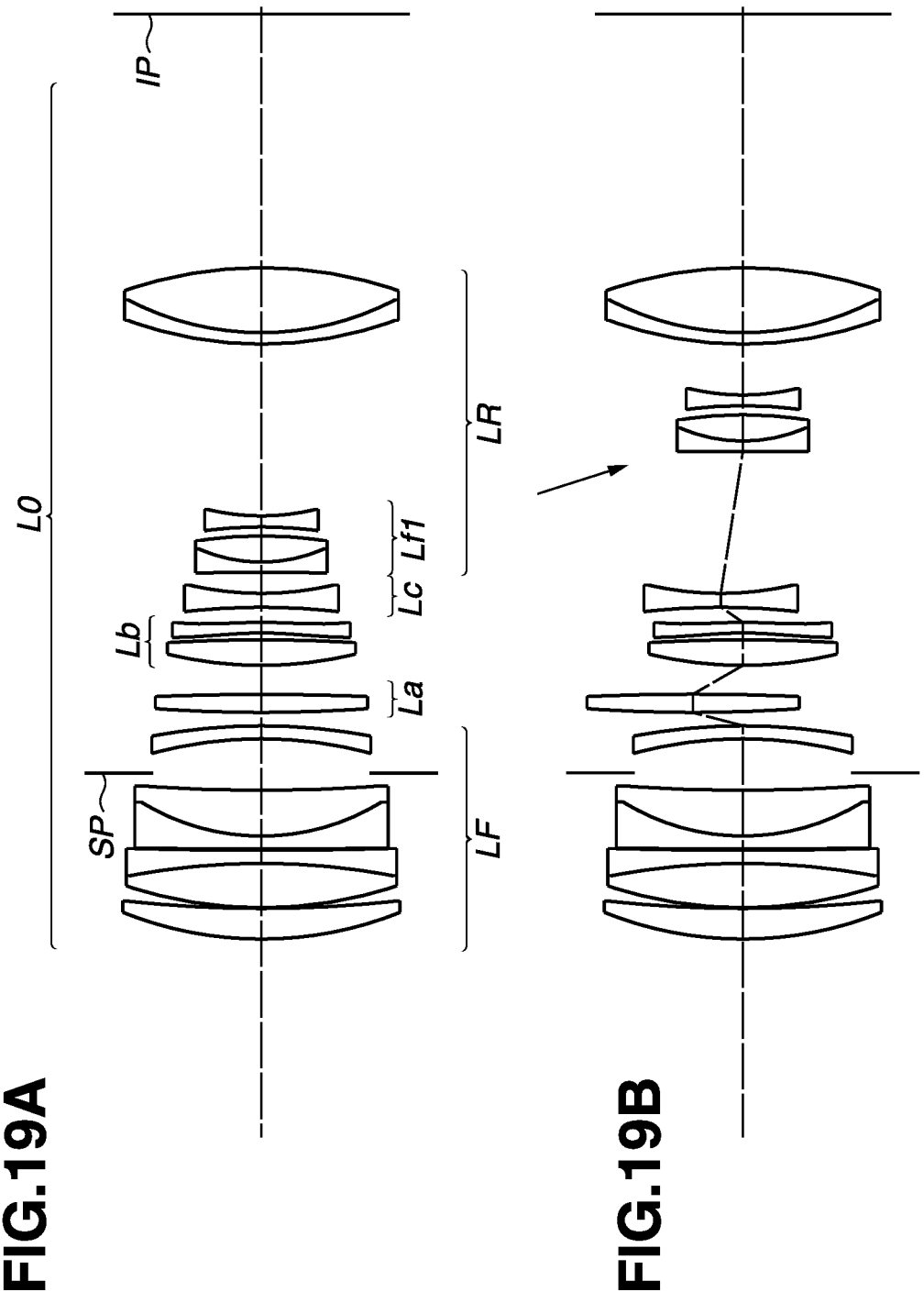
FIG. 19A is a diagram illustrating a section of an optical system according to Example 7 at the time of normal image-capturing and infinite in-focus)
FIG. 19B is a section of the optical system according to Example 7 at the time of tilt image-capturing and finite distance in-focus.
Figure 20A:
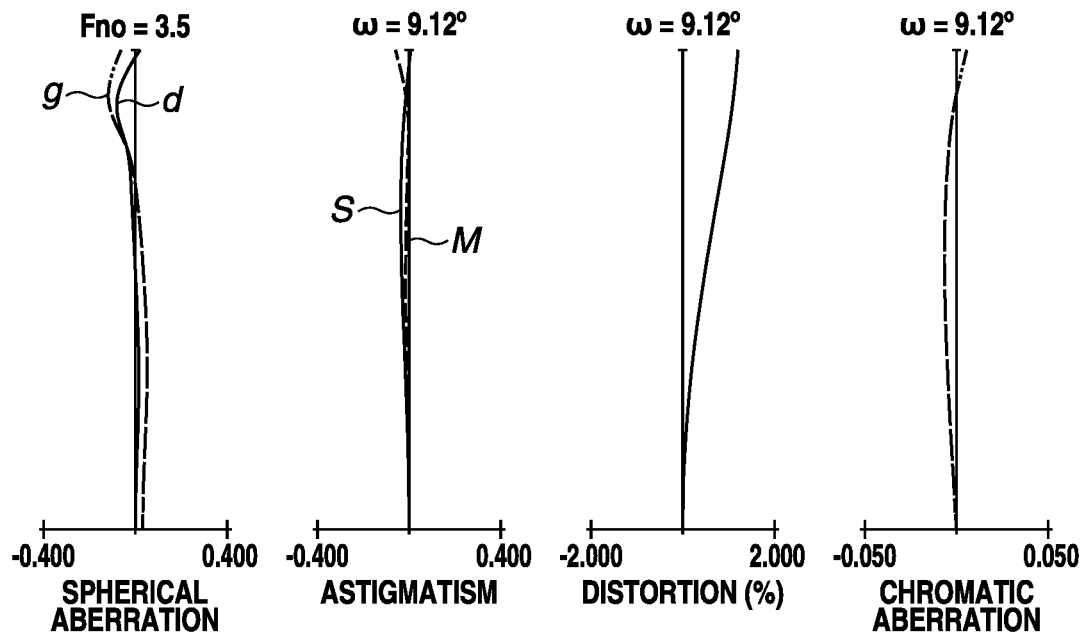
FIG. 20A is a diagram illustrating longitudinal aberration at the time of normal image-capturing and infinite in-focus.
Figure 20B:
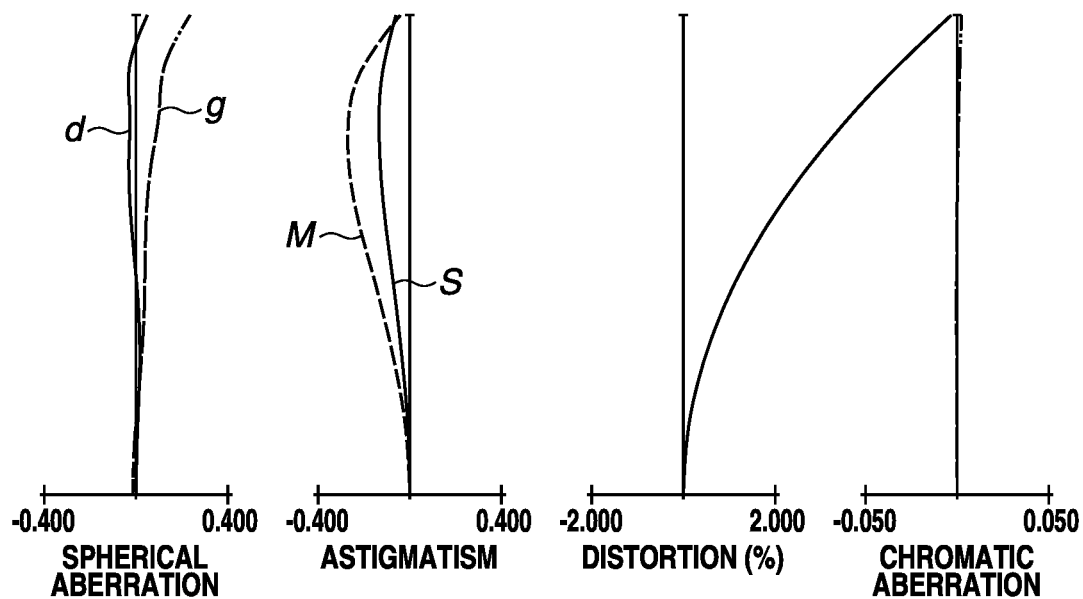
FIG. 20B is a diagram illustrating longitudinal aberration at the time of normal image-capturing and finite distance in-focus, for the optical system according to Example 7.

FIG. 15A is a transverse aberration diagram of Example 5 at the time of tilt image-capturing in a state where an object plane at a distance of about 5,000 mm away, on the optical axis, from a first surface is inclined at about 82 degrees with respect to a direction perpendicular to the optical axis of an imaging optical system. FIG. 15B is a transverse aberration diagram of Example 5 at the time of tilt image-capturing in a state where the object plane at a distance of about 75 mm away, on the optical axis, from the first surface is inclined at about 12 degrees with respect to the direction perpendicular to the optical axis of the imaging optical system. FIG. 18A is a transverse aberration diagram of Example 6 at the time of tilt image-capturing in a state where an object plane at a distance of about 9,000 mm away, on the optical axis, from a first surface is inclined at about 82 degrees with respect to a direction perpendicular to the optical axis of an imaging optical system. FIG. 18B is a transverse aberration diagram of Example 6 at the time of tilt image-capturing in a state where the object plane at a distance of about 185 mm away, on the optical axis, from the first surface is inclined at about 20 degrees with respect to the direction perpendicular to the optical axis of the imaging optical system.

Figure 21A:
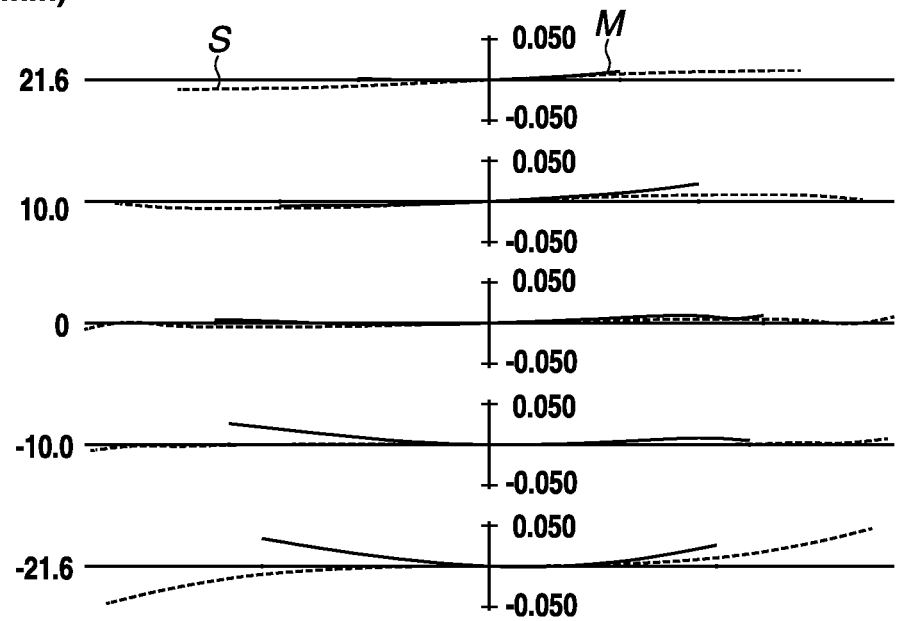
FIGS. 21A and 21B are diagrams each illustrating transverse aberration at the time of tilt image-capturing and finite distance in-focus, for the optical system according to Example 7.
Figure 21B:
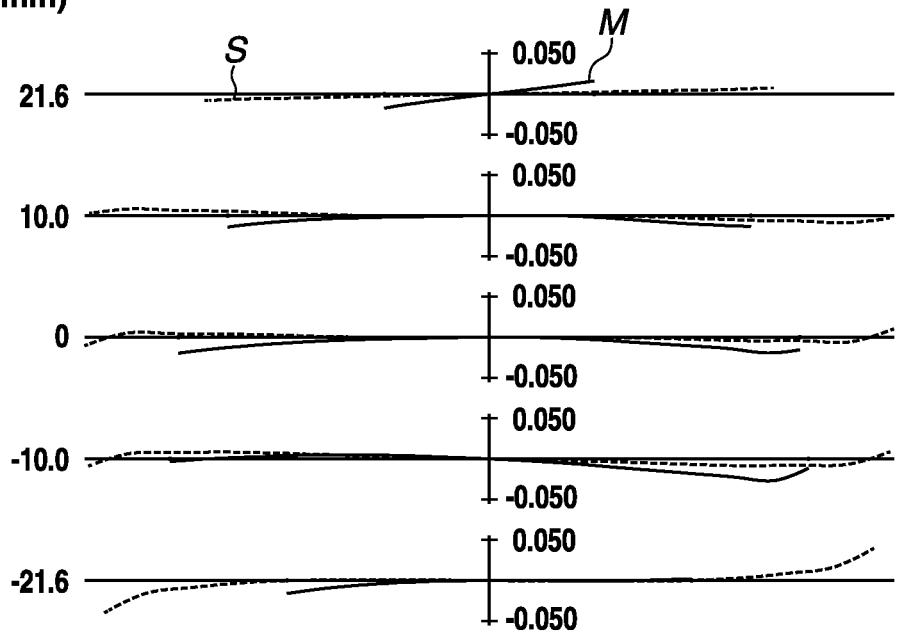
Figures 22A, 22B:
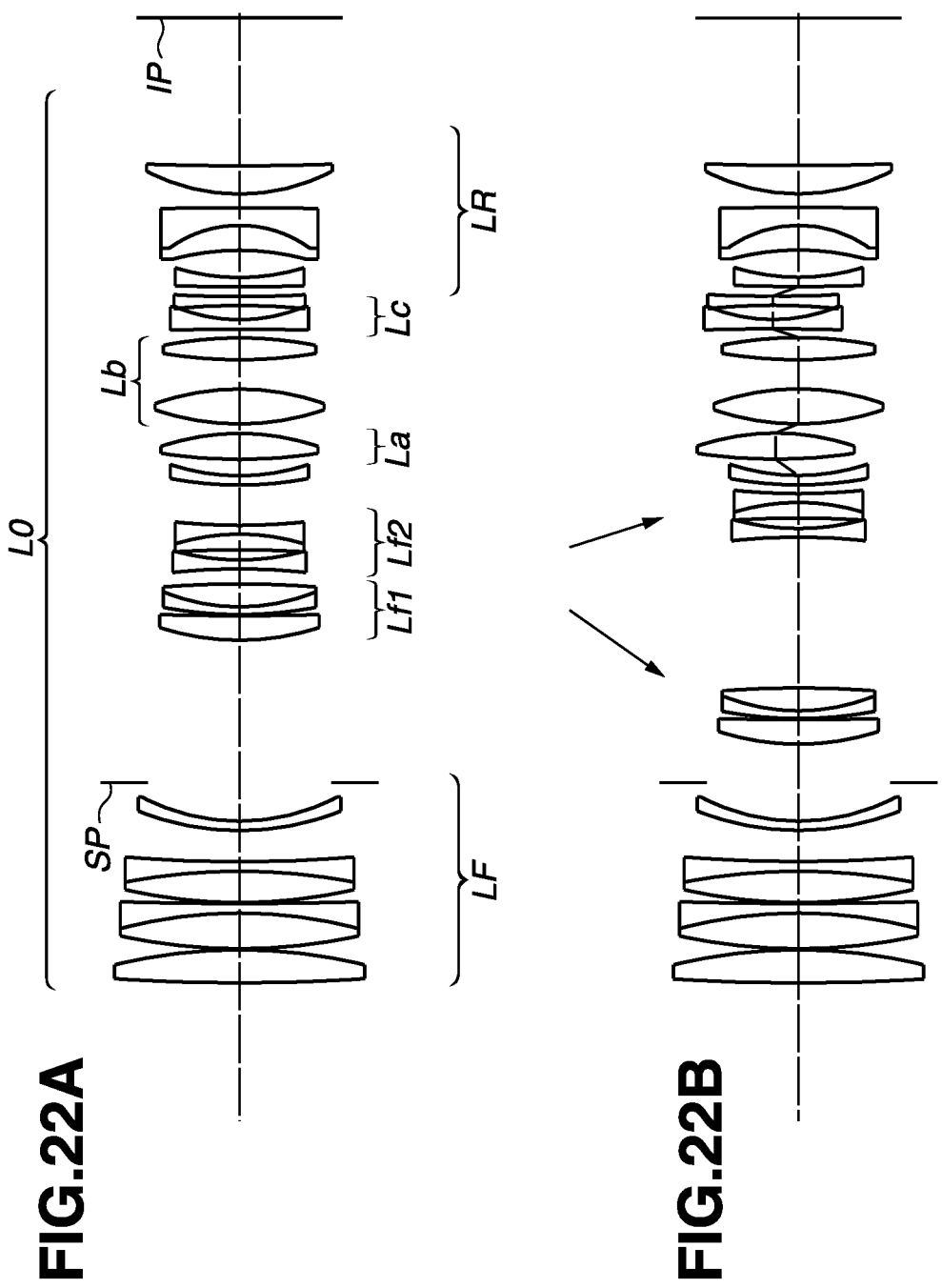
FIG. 22A is a diagram illustrating a section of an optical system according to Example 8 at the time of normal image-capturing and infinite in-focus.
FIG. 22B is a section of the optical system according to Example 8 at the time of tilt image-capturing and finite distance in-focus.
Figure 23A:
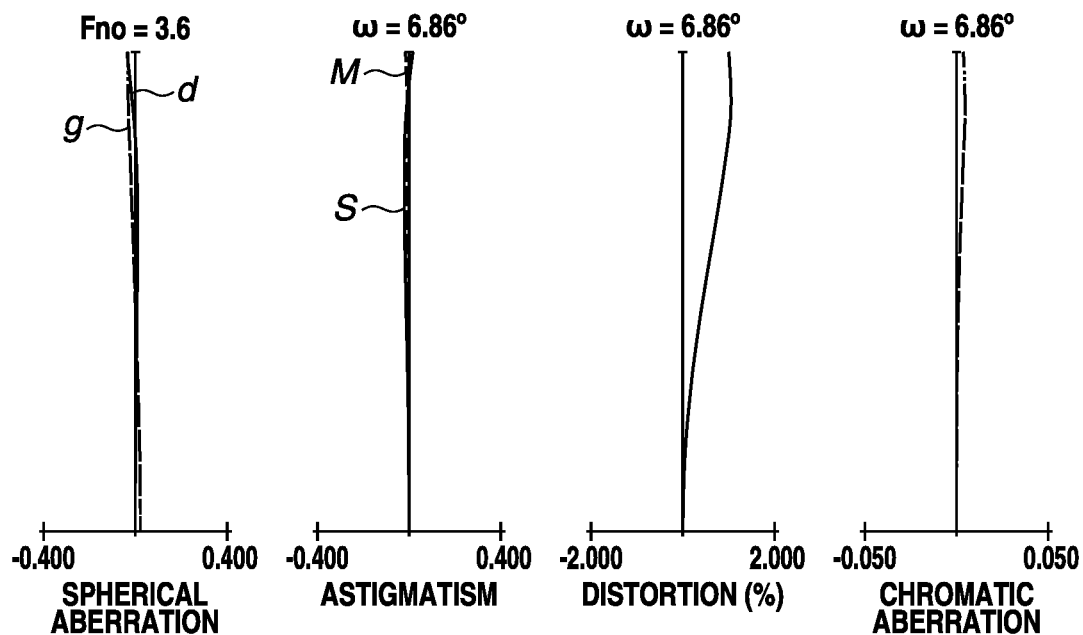
FIG. 23A is a diagram illustrating longitudinal aberration at the time of normal image-capturing and infinite in-focus.
Figure 23B:
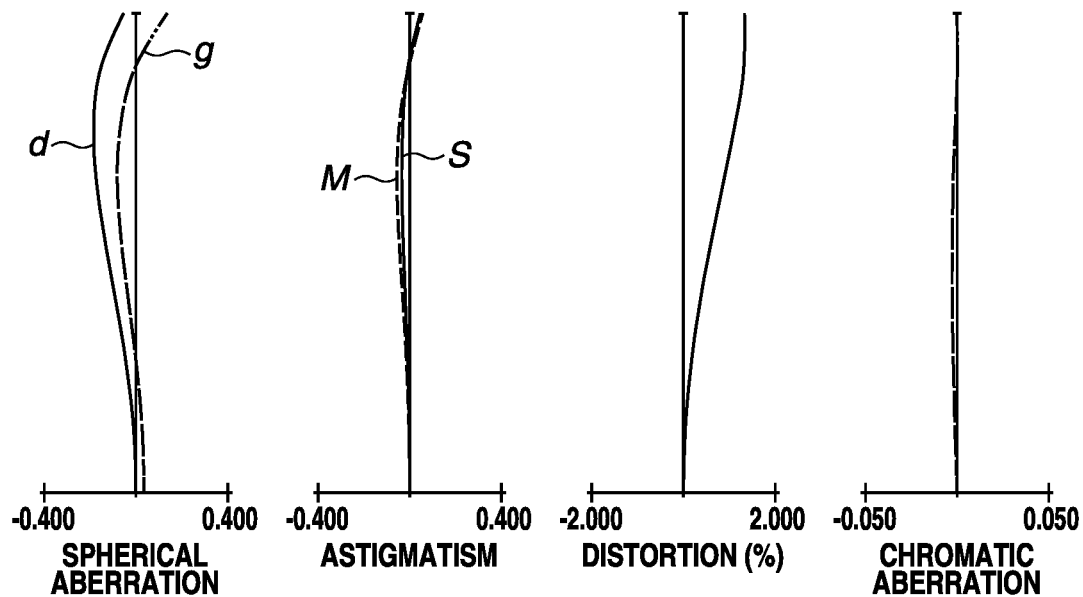
FIG. 23B is a diagram illustrating longitudinal aberration at the time of normal image-capturing and finite distance in-focus, for the optical system according to Example 8.
Figure 24A:
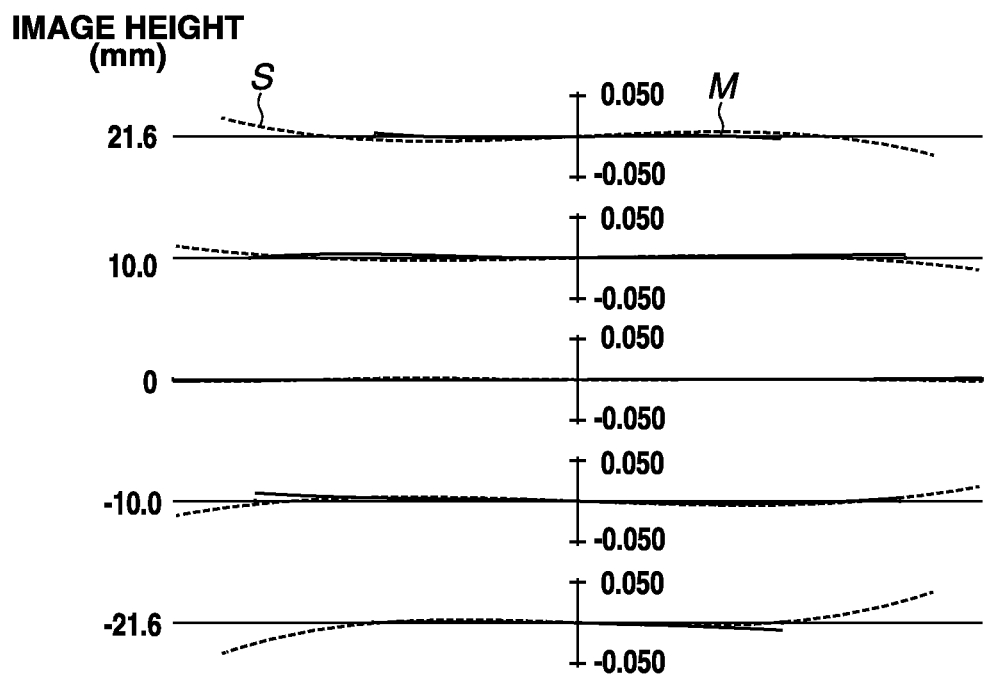
FIGS. 24A and 24B are diagrams each illustrating transverse aberration at the time of tilt image-capturing and finite distance in-focus of the optical system according to Example 8.
Figure 24B:
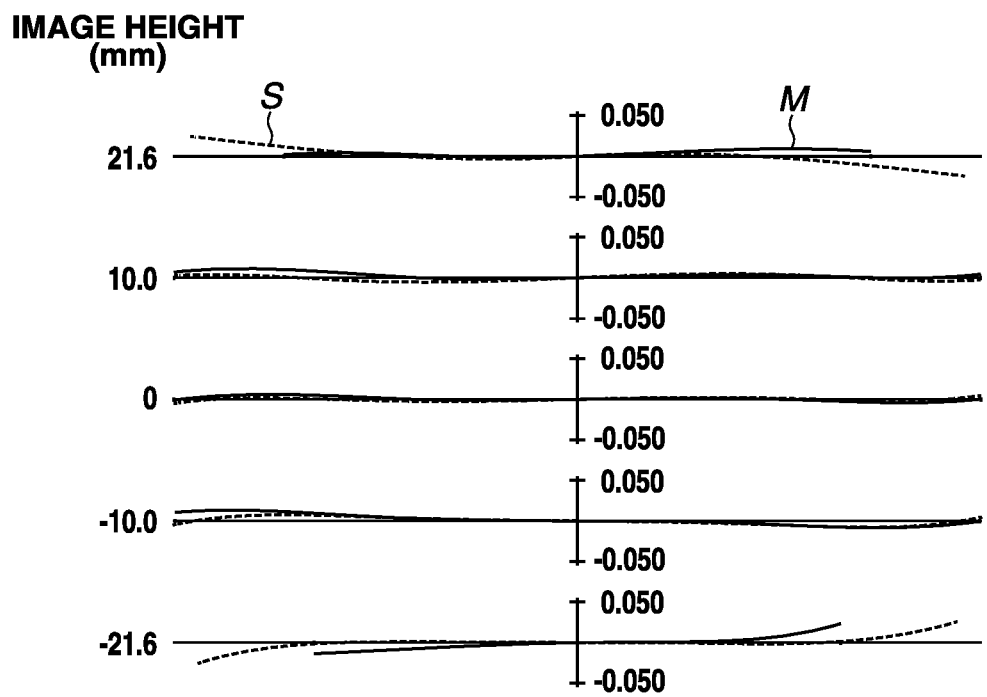

FIG. 21A is a transverse aberration diagram of Example 7 at the time of tilt image-capturing in a state where an object plane at a distance of about 7,500 mm away, on the optical axis, from a first surface is inclined at about 82 degrees with respect to a direction perpendicular to the optical axis of an imaging optical system. FIG. 21B is a transverse aberration diagram of Example 7 at the time of tilt image-capturing in a state where the object plane at a distance of about 432 mm away, on the optical axis, from the first surface is inclined at about 15 degrees with respect to the direction perpendicular to the optical axis of the imaging optical system. FIG. 24A is a transverse aberration diagram of Example 8 at the time of tilt image-capturing in a state where an object plane at a distance of about 9,000 mm away, on the optical axis, from a first surface is inclined at about 82 degrees with respect to a direction perpendicular to the optical axis of an imaging optical system. FIG. 24B is a transverse aberration diagram of Example 8 at the time of tilt image-capturing in a state where the object plane at a distance of about 212 mm away, on the optical axis, from the first surface is inclined at about 25 degrees with respect to a direction perpendicular to the optical axis of the imaging optical system.

In each of the transverse aberration diagrams, a broken line M indicates a meridional image plane, and a solid line S indicates a sagittal image plane.

Capturing an image with an object plane inclined with respect to the direction perpendicular to the optical axis being focused on is referred to as tilt image-capturing.

Next, the principle of the tilt image-capturing in the optical system in each of Examples will be described.

Figure 26:
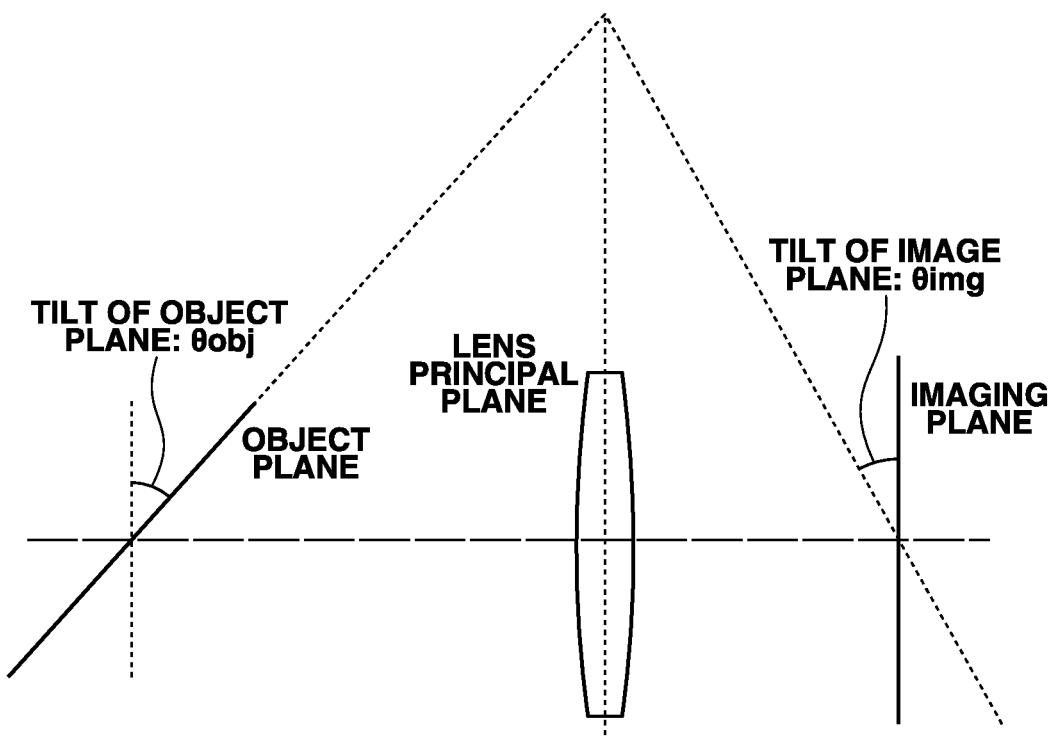
FIG. 26 is a diagram illustrating the Scheimpflug principle.

FIG. 26 is a diagram illustrating the Scheimpflug principle. With a lens having a principal plane in a direction perpendicular to an optical axis, an object plane inclined by an angle θobj with respect to the optical axis direction of an imaging optical system has a conjugation relationship with an image plane inclined from a vertical plane by an angle θimg. The imaging plane of a typical imaging apparatus is perpendicular to an optical axis, so that an object plane that is inclined to exceed a focal depth cannot achieve favorable focus.

Figure 27:
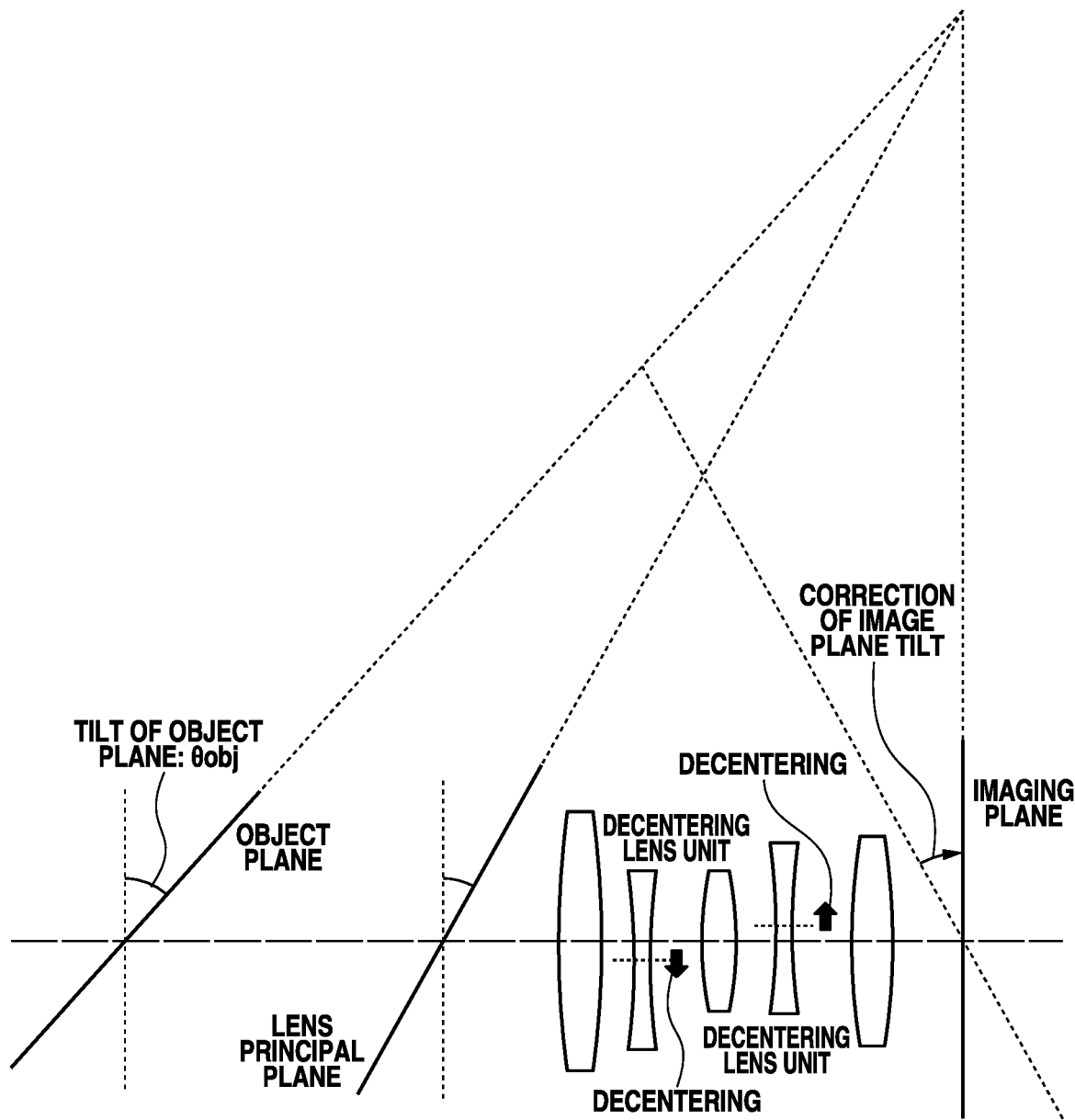
FIG. 27 is a diagram illustrating how an image plane tilt is corrected by parallel decentering of a lens unit.

As a technique of correcting this image plane inclination at the angle θimg caused by the object plane inclination at the angle ∝obj (hereinafter, such an image plane inclination is referred to as the image plane tilt), the decentering of the lens is used. Decentering the lens tilts the image plane in the optical axis direction, so that favorable focus can be achieved with respect to the inclined object plane, based on the Scheimpflug principal (FIG. 27). However, as the object plane inclined at the angle θobj approaches the principal plane of the lens, in other words, with a shorter distance imaging, an amount of the image plane tilt due to the inclination of the object plane increases, and thus the decentering amount of the lens is to be increased in order to bring focus on the image plane in the direction perpendicular to the optical axis.

To address this, in the optical system in each of Examples, the entire system is small, and a first lens unit and a third lens unit each having a component that moves in a direction perpendicular to the optical axis from an infinite object to a near object are disposed to incline the object plane on which focus is achieved to a great extent. Further, a second lens unit that does not move in a direction including a component of a direction perpendicular to the optical axis, for tilt image-capturing, is disposed between the first lens unit and the third lens unit. Moving a part of the optical system makes it easy to incline the object plane on which focus is achieved to a great extent while reducing a composition shift, despite the entire system being small.

Next, a characteristic configuration in the optical system of each of Examples will be described.

The optical system of each of Examples is capable of performing tilt image-capturing, and has an object-side lens unit LF, a first lens unit La having positive refractive power, a second lens unit Lb having positive refractive power, and a third lens unit Lc having negative refractive power, which are arranged in order from the object side. The first lens unit La and the third lens unit Lc each move in a direction including a component of a direction perpendicular to the optical axis in tilt image-capturing, and the second lens unit Lb does not move in a direction including a component of a direction perpendicular to the optical axis for tilt image-capturing.

The first lens unit La and the third lens unit Lc are moved in tilt image-capturing, so that the size is reduced in comparison with a configuration in which the entire optical system is inclined. Further, the correction of the composition shift is enabled, which facilitates the tilt image-capturing having a small composition change, in comparison with a configuration in which tilt image-capturing is performed with a single lens unit. Furthermore, the two lens units are moved, so that it is easy to correct various aberrations, such as coma aberration and magnification chromatic aberration, due to decentering.

Further, the second lens unit Lb that does not move in the direction including the component of the direction perpendicular to the optical axis for tilt image-capturing is disposed between the first lens unit La and the third lens unit Lc. This enables the control of a light ray to be incident on the third lens unit Lc with a plurality of lens units, so that various aberrations, such as coma aberration and magnification chromatic aberration, due to decentering are suitably correctable. The second lens unit Lb is configured so as not to move at the time of tilt image-capturing, so that a mechanical system in decentering lenses simplified, thus reducing manufacture variations, while performance is increased.

Furthermore, the object-side lens unit LF does not move in a direction including a component of a direction perpendicular to the optical axis for tilt image-capturing. The lens unit that is disposed closest to the object in the optical system tends to be large in the radial direction, and the size is increased if a mechanical system for decentering the lenses is disposed. Thus, fixing the lens unit during tilt image-capturing controls an increase in size controlled by.

Further, the first lens unit La has the positive refractive power, the second lens unit Lb has the positive refractive power, and the third lens unit Lc has the negative refractive power. The first lens unit La and the second lens unit Lb each have the positive refractive power, so that a height from the optical axis of an off-axis ray to be incident on the third lens unit Lc is reduced and that the third lens unit Lc is downsized. Furthermore, various aberrations occurring when the third lens unit Lc is decentered can be reduced by decreasing the height of the off-axis ray to be incident on the third lens unit Lc.

Further, the third lens unit Lc moves the front principal point of the entire optical system L0 toward the object by having the negative refractive power, so that the entire optical system L0 is downsized.

Furthermore, in the optical system of each of Examples, one or more of the following inequalities are satisfied.

$$Ma_{max}/Mc_{max} > 0 \quad (1)$$

$$0.05 < fa/f < 2.00 \quad (2)$$

$$-2.00 < fc/f < -0.05 \quad (3)$$

$$0.4 < |Pa| + |Pc| < 12.0 \quad (4)$$

$$0 < Lbk/f < 0.65 \quad (5)$$

$$0.5 < f/fb < 10.0 \quad (6)$$

$$\beta < -0.25 \quad (7)$$

$$0.01 < |Ma_{max}/fa| < 0.30 \quad (8)$$

$$0.01 < |Mc_{max}/fc| < 0.30 \quad (9)$$

$$-0.8 < (Rfa+Rra)/(Rra-Rfa) < 0.8 \quad (10)$$

$$-0.8 < (Rfc+Rrc)/(Rrc-Rfc) < 0.8 \quad (11)$$

$$-3.00 < mLf2/mLf1 < -0.10 \quad (12)$$

In the above inequalities, a maximum movement amount of the first lens unit La in the direction perpendicular to the optical axis is denoted by $Ma_{max}$, and a maximum movement amount of the third lens unit Lc in the direction perpendicular to the optical axis is denoted by $Mc_{max}$. Herein, the maximum movement amount is to difference between the surface vertex and the optical axis in the radial direction when the lens unit has been moved for tilt image-capturing, in comparison with a state where tilt image-capturing is not performed, and the direction in which the first lens unit La moves is positive, whereas the direction opposite to the direction in which the first lens unit La moves is negative. In a case where the movement amount varies depending on each surface vertex, the largest movement amount among the movement amounts of the respective surface vertexes is regarded as the maximum movement amount.

In the above inequalities, the focal length of the first lens unit La is denoted by fa, and the focal length of the third lens unit Lc is denoted by fc. The Petzval sum of the first lens unit La is denoted by Pa, and the Petzval sum of the third lens unit Lc is denoted by Pc. The focal length of the entire optical system L0 is denoted by f, and the back focus of the optical system L0 is denoted by Lbk. The focal length of the second lens unit Lb is denoted by fb. The lateral magnification at the time of closest focus of the optical system L0 is denoted by $\beta$. The paraxial curvature radius of the object-side lens surface of the lens disposed closest to the object in the first lens unit La is denoted by Rfa, and the paraxial curvature radius of the image-side lens surface of the lens disposed closest to the image plane in the first lens unit La is denoted by Rra.

The paraxial curvature radius of the object-side lens surface of the lens disposed closest to the object in the third lens unit Lc is denoted by Rfc, and the paraxial curvature radius of the image-side lens surface of the lens disposed closest to the image plane in the third lens unit Lc is denoted by Rrc. The movement amount of a first focusing unit Lf1, in the object-side lens unit LF, in focusing from the infinite distance to the closest distance is denoted by mLf1. The movement amount of a second focusing unit Lf2, disposed on the image side of the first focusing unit Lf1, in focusing from the infinite distance to the closest distance is denoted by mLf2. Here, the movement amount in focusing in the case of movement from the image side to the object side is positive, and is negative in the case of movement from the object side to the image side.

Next, the technical meaning of each of the above-described inequalities will be described.

The inequality (1) expresses the ratio between the movement amount of the first lens unit La in the direction perpendicular to the optical axis resulting from the decentering and the movement amount of the third lens unit Lc in the direction perpendicular to the optical axis resulting from the decentering. In a case where the inequality (1) is satisfied, the directions of the composition shifts due to the decentering of the respective lens units are opposite directions, and thus have a relationship of cancelling out each other's composition shift. In other words, the composition shifts are reduced. In a case where the moving directions are reversed, the composition shifts increase, and thus such a configuration is not desirable.

The inequality (2) defines the ratio of the focal length of the first lens unit La to the focal length of the entire optical system L0. In a case where fa/f falls below the lower limit, a decentering aberration amount per unit decentering amount increases, which makes it difficult to maintain favorable optical performance at the time of tilt image-capturing. In a case where fa/f exceeds the upper limit, a large decentering amount is to be used to incline the object plane on which focus is achieved to a great extent, which is accompanied by an increase in the lens diameter of the first lens unit La, so that the size increases.

The inequality (3) defines the ratio of the focal length of the third lens unit Lc to the focal length of the entire optical system L0. In a case where fc/f falls below the lower limit, a large decentering amount is to be used to incline the object plane on which focus is achieved to a great extent, which is accompanied by an increase in the lens diameter of the third lens unit Lc, so that the size increases. In a case where fc/f exceeds the upper limit, the decentering aberration amount per unit decentering amount increases, which makes it difficult to maintain favorable optical performance at the time of tilt image-capturing, and thus such a configuration is not desirable.

The inequality (4) defines the sum of the Petzval sum of the first lens unit La and the Petzval sum of the third lens unit Lc. In a case where |Pa|+|Pc| falls below the lower limit, a large decentering amount is to be used to incline the object plane on which focus is achieved to a great extent at the time of tilt image-capturing, which is accompanied by an increase in the lens diameter of the decentered lens unit, and thus the size of the optical system increases. In a case where |Pa|+|Pc| exceeds the upper limit, the decentering aberration amount per unit decentering amount increases, which makes it difficult to maintain favorable optical performance at the time of tilt image-capturing.

The Petzval sum of the inequality (4) is defined by the following equation.

$$P = -\sum_{v=i}^{k} \left( \frac{1}{N'_v} - \frac{1}{N_v} \right) \frac{f}{r_v} \quad \text{[Equation 1]}$$

Pv: Petzval sum of vth surface
rv: Paraxial curvature radius of vth surface
Nv: Refractive index of d-line of incident-side medium of vth surface
N'v: Refractive index of d-line of output-side medium of vth surface
f: Focal length of entire optical system The inequality (5) defines the ratio of the back focus to the focal length of the entire optical system L0. In a case where Lbk/f exceeds the upper limit, the overall lens length increases, and thus such a configuration is not desirable. In a case where Lbk/f exceeds the lower limit, the lens comes into contact with the image sensor, and thus such a configuration is not desirable. The lenses are each disposed at a position at which the height of the off-axis ray from the optical axis is large so as to satisfy the inequality (5), which makes it easy to correct the field curvature, so that favorable optical performance can be achieved.

The inequality (6) defines the ratio of the focal length of the entire optical system L0 to the focal length of the second lens unit Lb. In a case where f/fb falls below the lower limit, the refractive power of the second lens unit Lb becomes too weak, which makes it difficult to reduce the height of the off-axis ray to be incident on the third lens unit Lc, so that the size of the third lens unit Lc increases, which is not desirable. In a case where f/fb exceeds the upper limit, the refractive power of the second lens unit Lb becomes too strong, which makes it difficult to correct various aberrations occurring in the second lens unit Lb.

The inequality (7) relates to the magnification of the optical system L0. In a case where the upper limit of this inequality is exceeded, sufficient photographing magnification is not obtained, which makes it difficult to perform short distance image-capturing, which is not desirable.

The inequality (8) defines the ratio between the focal length of the first lens unit La and the maximum movement amount in the direction perpendicular to the optical axis of the first lens unit La. In a case where $|Ma_{max}/fa|$ falls below the lower limit, the movement amount with respect to the optical axis of the first lens unit La is small, which makes it difficult to incline the object plane on which focus is achieved to a great extent. In case where $|Ma_{max}/fa|$ exceeds the upper limit, the refractive power of the first lens unit La increases, and the decentering aberration amount per unit decentering amount also increases, which makes it difficult to maintain favorable optical performance at the time of tilt image-capturing.

The inequality (9) defines the ratio between the focal length of the third lens unit Lc and the maximum movement amount in the direction perpendicular to the optical axis of the third lens unit Lc. In a case where $|Mc_{max}/fc|$ falls below the lower limit, the movement amount with respect to the optical axis of the third lens unit Lc decreases, so that a sufficient image plane tilt amount cannot be obtained at the time of tilt image-capturing, which makes it difficult to incline the object plane on which focus is achieved to a great extent. In a case where $|Mc_{max}/fc|$ exceeds the upper limit, the refractive power of the third lens unit Lc increases, and the decentering aberration amount per unit decentering amount also increases, which makes it difficult to maintain favorable optical performance at the time of tilt image-capturing.

The inequality (10) defines the shape factor of the object-side lens surface of the lens disposed closest to the object in the first lens unit La, and the image-side lens surface of the lens disposed closest to the image plane in the first lens unit La. When (Rfa+Rra)/(Rra−Rfa) exceeds the upper limit or falls below the lower limit, and the first lens unit La becomes closer to a meniscus shape, the refractive power of the first lens unit La decreases, and the image plane tilt amount also decreases, so that it is difficult to incline the object plane on which focus is achieved to a great extent.

The inequality (11) defines the shape factor of the object-side lens surface of the lens disposed closest to the object in the third lens unit Lc, and the image-side lens surface of the lens disposed closest to the image plane in the third lens unit Lc. When (Rfc+Rrc)/(Rrc−Rfc) exceeds the upper limit or falls below the lower limit, and the third lens unit Lc becomes closer to a meniscus shape, the refractive power of the third lens unit Lc decreases, and the image plane tilt amount also decreases, so that it is difficult to incline the object plane on which focus is achieved to a great extent.

The inequality (12) defines the ratio between the movement amount of the first focusing unit Lf1 in focusing and the movement amount of the second focusing unit Lf2, disposed on the image plane side of the first focusing unit Lf1, in focusing. The first focusing unit Lf1 and the second focusing unit Lf2 move in opposite directions from the infinite distance to the closest distance, so that it is easy to reduce fluctuations in various aberrations accompanied by object distance fluctuations. If mLf2/mLf1 exceeds the upper limit, the movement amount of the second focusing unit Lf2 decreases, which makes it difficult to correct, in particular, the field curvature aberration. If mLf2/mLf1 falls below the lower limit, the movement amount of the first focusing unit Lf1 decreases, which makes it difficult to correct, in particular, the spherical aberration.

In one embodiment, the optical system of each of Examples, the inequalities (1) to (12) may be set as follows.

$$0.30 < Ma_{max}/Mc_{max} < 3.00 \quad (1a)$$

$$0.10 < fa/f < 1.50 \quad (2a)$$

$$-1.50 < fc/f < -0.10 \quad (3a)$$

$$0.8 < |Pa| + |Pc| < 10.0 \quad (4a)$$

$$0.05 < Lbk/f < 0.50 \quad (5a)$$

$$1.0 < f/fb < 9.0 \quad (6a)$$

$$-2.5 < \beta < -0.3 \quad (7a)$$

$$0.02 < |Ma_{max}/fa| < 0.25 \quad (8a)$$

$$0.02 < |Mc_{max}/fc| < 0.27 \quad (9a)$$

$$-0.7 < (Rfa + Rra)/(Rra - Rfa) < 0.7 \quad (10a)$$

$$-0.75 < (Rfb + Rrb)/(Rrb - Rfb) < 0.75 \quad (11a)$$

$$-2.50 < mLf2/mLf1 < -0.20 \quad (12a)$$

In another embodiment, the optical system of each of Examples, the numerical value range of each of the inequalities (1a) to (12a) may be set as follows.

$$0.60 < Ma_{max}/Mc_{max} < 2.50 \quad (1b)$$

$$0.15 < fa/f < 1.20 \quad (2b)$$

$$-1.20 < fc/f < -0.15 \quad (3b)$$

$$1.2 < |Pa| + |Pc| < 8.0 \quad (4b)$$

$$0.07 < Lbk/f < 0.40 \quad (5b)$$

$$1.5 < f/fb < 8.0 \quad (6b)$$

$$-1.5 < \beta < -0.32 \quad (7b)$$

$$0.03 < |Ma_{max}/fa| < 0.20 \quad (8b)$$

$$0.05 < |Mc_{max}/fc| < 0.25 \quad (9b)$$

$$-0.6 < (Rfa + Rra)/(Rra - Rfa) < 0.6 \quad (10b)$$

$$-0.7 < (Rfb + Rrb)/(Rrb - Rfb) < 0.7 \quad (11b)$$

$$-2.00 < mLf2/mLf1 < -0.25 \quad (12b)$$

In one embodiment, the object-side lens unit LF have positive refractive power. The object-side lens unit LF having the positive refractive power enables the on-axis light ray to converge, so that the diameter of the lens unit that is moved in decentering can be reduced.

In one embodiment, the object-side lens unit LF have the first focusing unit Lf1 that moves in the optical axis direction for focusing. Disposing the first focusing unit Lf1 at a position at which the on-axis light ray is relatively large increases the movement amount of the image plane in the optical axis direction with respect to the movement amount per unit when the first focusing unit Lf1 has moved for focusing. Therefore, the movement amount of the first focusing unit Lf1 from the infinite distance to the closest distance can be reduced, and an extra space is therefore unnecessary, thus downsizing the entire system.

Further, in one embodiment, the second focusing unit Lf2 moves for focusing and is disposed closer to the image plane than the first focusing unit Lf1. The plurality of focusing units are moved for focusing, so that it is easy to correct aberrations due to object distance fluctuations, thus enhancing the performance for short distance.

In each Example, each element is specified as described above, thus realizing the optical system that can incline the object plane on which focus is achieved to a great extent while reducing the composition shift, despite the entire system being small.

Next, the lens configuration of each of the Examples will be described in detail.

The optical system L0 of Example 1 is composed of the object-side lens unit LF, the first focusing unit Lf1, the second focusing unit Lf2, the first lens unit La, the second lens unit Lb, the third lens unit Lc, and an image-side lens unit LR, which are arranged in order from the object side. The image-side lens unit LR is disposed closer to the image plane than the third lens unit Lc. Thus, the image-side lens unit LR can be disposed at a position at which the off-axis ray is high, so that the field curvature is well corrected. The first focusing unit Lf1 and the second focusing unit Lf2 are disposed at positions close to the diaphragm. Thus, the first focusing unit Lf1 and the second focusing unit Lf2 are disposed at positions at which the off-axis ray is low, so that the diameter of each of the first focusing unit Lf1 and the second focusing unit Lf2 is made small.

In the optical system L0 of Example 2, the first lens unit La and the third lens unit Lc each consist of two lens including a positive lens and a negative lens. This further controls the occurrence of the chromatic aberration, even in a case where the first lens unit La and the third lens unit Lc are decentered at the time of tilt image-capturing.

In the optical system L0 of Example 3, the first focusing unit Lf1 is moved for focusing. The configuration in which a single lens unit is moved for focusing leads to reduction in variations at the time of manufacture, thus achieving higher performance. A negative lens that does not move for focusing and does not move for tilt image-capturing either is disposed between the first focusing unit Lf1 and the first lens unit La. This makes it easy to control the light ray to be incident on the first lens unit La from the object side, and higher performance is achieved for tilt image-capturing.

In the optical system L0 of Example 4, the second focusing unit Lf2 is disposed in the image-side lens unit LR. Thus, the second focusing unit Lf2 is disposed at a position at which the off-axis ray is high, so that an off-axis aberration, such as the field curvature aberration, that occurs when the object distance fluctuates is well corrected.

In the optical system L0 of Example 5, the first focusing unit Lf1 and the second focusing unit Lf2 each have a cemented lens consisting of a positive lens and a negative lens. This reduces fluctuations in the chromatic aberration that occur in focusing from the infinite distance to the closest distance.

In the optical system L0 of Example 6, a cemented lens that consists of a negative lens and a positive lens, does not move for focusing, and does not move for tilt image-capturing either is disposed between the first focusing unit Lf1 and the first lens unit La. This reduces the chromatic aberration related to decentering occurring for tilt image-capturing, so that higher performance is achieved for tilt image-capturing.

In the optical system L0 of Example 7, the first focusing unit Lf1 is the unit that is moved for focusing, and is disposed in the image-side lens unit LR. The first focusing unit Lf1 is disposed in the image-side lens unit LR so that the les unit that is moved for focusing (the first focusing unit Lf1) is at a position at which the on-axis light ray is relatively small. Thus, the diameter of the first focusing unit Lf1 is reduced.

In the optical system L0 of Example 8, the second lens unit Lb is composed of two positive lenses. The refractive power is shared, so that the off-axis ray is gently curved, the occurrence of the aberration related to the decentering is reduced, and that higher performance is achieved for tilt image-capturing.

In each of Examples 1 to 8, each of all the configured lenses is a spherical lens, in order to control a reduction in optical performance due to a manufacturing error.

Figure 25:
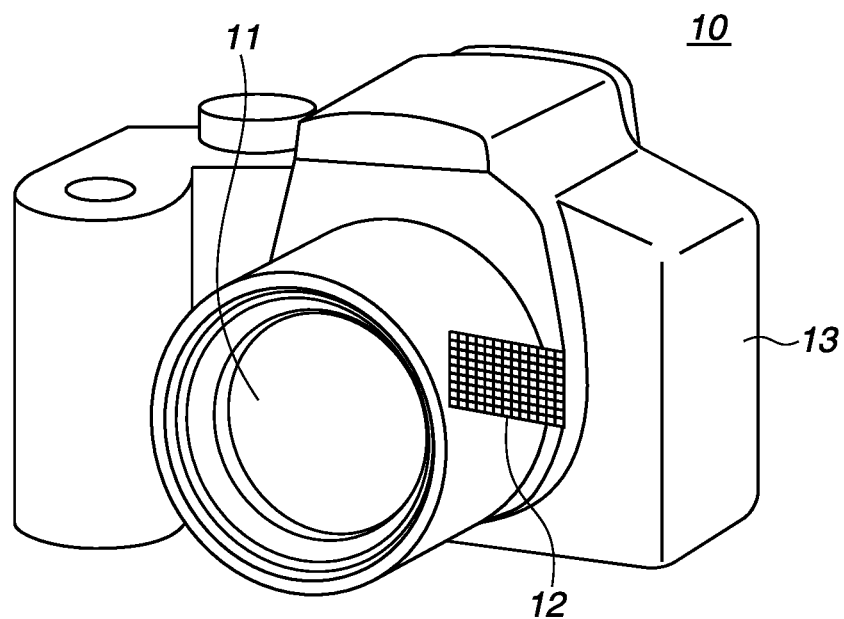
FIG. 25 is a schematic diagram illustrating a main part of an imaging apparatus according to an example of the disclosure.

Next, an exemplary embodiment of a digital still camera (an imaging apparatus) using the optical system in any of the Examples as an imaging optical system will be described with reference to FIG. 25. FIG. 25 illustrates a camera main body 13, and an image-capturing optical system 11 including the optical system described in any of Examples 1 to 8. A sensor 12 is a solid-state image sensor (a photoelectric conversion element), such as a CCD sensor or a CMOS sensor, and is built in the camera main body 13. The sensor 12 receives light of an optical image formed by the image-capturing optical system 11, and photoelectrically converts the received light. The camera main body 13 may be a single-lens reflex camera with a quick turn mirror, or may be a mirrorless camera without a quick turn mirror.

In this way, the optical system in each of the Examples is applied to the imaging apparatus, such as the digital still camera or the like, so that it is possible to obtain a small imaging apparatus, with a reduced composition shift, capable of inclining an object plane on which focus is achieved to a great extent.

Specific Numerical Examples 1 to 8 corresponding to Examples 1 to 8, respectively, will be described below.

In surface data of each of the Numerical Examples 1 to 8, r represents the curvature radius of each optical surface, and d (mm) represents an on-axis interval (a distance on the optical axis) between an m-th surface and an (m+1)-th surface. However, m is a number representing a surface counted from the light incident side. Further, nd represents a refractive index with respect to the d-line of each optical member, and vd represents the Abbe number of the optical member. In a case where the refractive index of the d-line (587.6 nm) of the Fraunhofer line, the refractive index of an F-line (486.1 nm), and the refractive index of a C-line (656.3 nm) are Nd, NF, and NC, respectively, the Abbe number vd of a material is expressed by vd=(Nd−1)/(NF−NC).

In each of the Numerical Examples 1 to 8, d, focal length (mm), F-number, and half angle of view (°) all correspond to values when the optical system of the corresponding Example focuses on the infinite distance. "Back focus BF" is a distance on the optical axis from the lens last surface (a lens surface closest to the image plane) to a paraxial image plane, expressed in an air-equivalent length. "Overall lens length" is a length determined by adding a back focus to a distance on the optical axis from the forefront surface (the lens surface closest to the object) of the zoom lens to the lens last surface. "Lens unit" is not limited to one consisting of a plurality of lens, but also includes one consisting of a single lens.

Numerical Example 1

Unit: mm

Surface Data

| Surface Number | r | d | nd | vd |
|---|---|---|---|---|
| 1 | 174.719 | 4.93 | 1.48749 | 70.2 |
| 2 | −267.020 | 2.00 | | |
| 3 | 80.513 | 4.62 | 1.49684 | 81.7 |
| 4 | 285.557 | 5.29 | | |
| 5 | 50.471 | 7.23 | 1.49629 | 82.0 |
| 6 | −511.388 | 1.93 | 1.70967 | 56.3 |
| 7 | 41.048 | (variable) | | |
| 8 | 41.700 | 4.87 | 1.49619 | 82.0 |
| 9 | −6326.860 | 0.20 | | |
| 10 | 68.544 | 1.42 | 1.77124 | 50.5 |
| 11 | 27.709 | 5.20 | 1.49599 | 82.1 |
| 12 | −888.343 | (variable) | | |
| 13 (aperture) | ∞ | (variable) | | |
| 14 | −119.115 | 1.72 | 1.81505 | 46.8 |
| 15 | 44.102 | 2.36 | | |
| 16 | −85.452 | 1.75 | 1.81509 | 46.8 |
| 17 | 54.420 | 3.23 | 1.90264 | 19.5 |
| 18 | −416.345 | (variable) | | |
| 19 | 112.731 | 1.87 | 1.92330 | 18.9 |
| 20 | 54.385 | 1.96 | | |
| 21* | 61.745 | 6.27 | 1.58313 | 59.4 |
| 22* | −38.905 | 1.91 | | |
| 23* | 47.660 | 8.20 | 1.49700 | 81.5 |
| 24* | −37.336 | 1.72 | | |
| 25* | −139.574 | 1.88 | 1.58313 | 59.4 |
| 26* | 29.777 | 6.85 | | |
| 27 | −88.136 | 4.55 | 1.72165 | 44.2 |
| 28 | −28.483 | 1.98 | 1.49652 | 82.0 |
| 29 | 81.833 | 16.86 | | |
| 30 | −67.083 | 1.99 | 1.59885 | 67.4 |
| 31 | 271.152 | 0.18 | | |
| 32 | 37.993 | 5.43 | 1.49939 | 76.3 |
| 33 | 112.075 | (variable) | | |
| Image Plane | ∞ | | | |

Aspherical Data

21st Surface

K = 0.00000e+00 A 4 = −3.48002e−06 A 6 = −6.56240e−09
A 8 = 4.08341e−11 A 10 = −5.55830e−14

22nd Surface

K = 0.00000e+00 A 4 = 6.17521e−06 A 6 = −4.89932e−09
A 8 = 1.54432e−11 A 10 = −9.57953e−15

23rd Surface

K = 0.00000e+00 A 4 = 2.09252e−06 A 6 = −6.35516e−10
A 8 = 1.32715e−12 A 10 = 2.01394e−15

24th Surface

K = 0.00000e+00 A 4 = 5.96878e−06 A 6 = −2.65107e−09
A 8 = 7.36761e−12 A 10 = −3.82552e−15

25th Surface

K = 0.00000e+00 A 4 = 1.96060e−05 A 6 = −7.08573e−08
A 8 = 1.51309e−10 A 10 = −1.46756e−13

26th Surface

K = 0.00000e+00 A 4 = 1.78945e−05 A 6 = −5.37049e−08
A 8 = 7.12464e−11 A 10 = 7.47341e−15

Various Data

| Focal Length | 179.88 |
|---|---|
| F-number | 3.60 |

-continued

Unit: mm

| | |
|---|---|
| Angle of View | 6.86 |
| Image Height | 21.64 |
| Overall Lens Length | 198.10 |
| BF | 27.03 |

The aberration diagram of the first tilt image-capturing and the aberration diagram of the second tilt image-capturing in Numerical Example 1 indicate FIG. 3A and FIG. 3B, respectively.

| | Infinite | Maximum Magnification | First Tilt Image-Capturing | Second Tilt Image-Capturing |
|---|---|---|---|---|
| d7 | 45.15 | 21.15 | 44.65 | 21.63 |
| d12 | 2.82 | 26.82 | 3.31 | 26.33 |
| d13 | 3.31 | 12.80 | 3.60 | 12.80 |
| d18 | 11.40 | 1.91 | 11.10 | 1.90 |
| d20 | 1.96 | 1.96 | 1.96 | 1.96 |
| d22 | 1.91 | 1.91 | 1.91 | 1.91 |
| d24 | 1.72 | 1.72 | 1.72 | 1.72 |
| d26 | 6.85 | 6.85 | 6.85 | 6.85 |
| d33 | 27.03 | 27.03 | 26.90 | 26.90 |

| | First Tilt Image-Capturing | Second Tilt Image-Capturing |
|---|---|---|
| Ma | 1.82 | 5.55 |
| Mb | 2.46 | 7.52 |

Lens Unit Data

| Unit | Starting Surface | Focal Length |
|---|---|---|
| 1 | 1 | 264.44 |
| 2 | 8 | 71.84 |
| 3 | 14 | -31.91 |
| 4 | 19 | -115.58 |
| 5 | 21 | 41.89 |
| 6 | 23 | 43.52 |
| 7 | 25 | -41.91 |
| 8 | 27 | -111.44 |

Numerical Example 2

Unit: mm

Surface Data

| Surface Number | r | d | nd | νd |
|---|---|---|---|---|
| 1 | 136.089 | 5.05 | 1.48749 | 70.2 |
| 2 | -389.025 | 2.02 | | |
| 3 | 72.988 | 5.29 | 1.49700 | 81.5 |
| 4 | 389.581 | 2.03 | | |
| 5 | 47.577 | 7.39 | 1.49700 | 81.5 |
| 6 | -1571.141 | 1.96 | 1.73623 | 54.0 |
| 7 | 37.966 | (variable) | | |
| 8 | 38.764 | 4.87 | 1.49700 | 81.5 |
| 9 | -1245.436 | 0.20 | | |
| 10 | 73.334 | 1.32 | 1.74071 | 53.5 |
| 11 | 25.419 | 4.98 | 1.49700 | 81.5 |
| 12 | 2315.989 | (variable) | | |
| 13 (aperture) | ∞ | (variable) | | |
| 14 | -156.211 | 1.73 | 1.81530 | 46.8 |
| 15 | 38.210 | 2.46 | | |
| 16 | -73.964 | 1.86 | 1.72885 | 54.8 |
| 17 | 54.561 | 3.14 | 1.89883 | 19.6 |
| 18 | -443.151 | (variable) | | |
| 19 | 140.170 | 1.88 | 1.92318 | 18.9 |
| 20 | 70.989 | 1.93 | | |
| 21 | 78.105 | 1.85 | 1.84670 | 23.8 |
| 22 | 62.149 | 6.67 | 1.58313 | 59.4 |
| 23* | -34.338 | 1.83 | | |
| 24* | 38.026 | 8.60 | 1.49700 | 81.5 |
| 25* | -36.702 | 1.74 | | |
| 26 | -68.602 | 2.94 | 1.61671 | 37.3 |
| 27 | -39.262 | 1.73 | 1.58313 | 59.4 |
| 28* | 22.820 | 7.29 | | |
| 29 | -54.316 | 4.56 | 1.49681 | 81.8 |
| 30 | 66.821 | 2.72 | | |
| 31 | 41.836 | 9.40 | 1.65966 | 33.2 |
| 32 | -31.910 | 6.30 | 1.91663 | 31.6 |
| 33 | 71.441 | 0.06 | | |
| 34 | 41.525 | 11.99 | 1.52629 | 50.6 |
| 35 | 813.184 | (variable) | | |
| Image Plane | ∞ | | | |

Aspherical Data

23rd Surface

K = 0.00000e+00 A 4 = 1.08438e-05 A 6 = -1.38407e-08
A 8 = 2.21357e-11 A 10 = -1.13390e-14

24th Surface

K = 0.00000e+00 A 4 = 3.50524e-06 A 6 = 7.05381e-09
A 8 = -3.59642e-11 A 10 = 7.00151e-14

25th Surface

K = 0.00000e+00 A 4 = 8.66648e-06 A 6 = 1.16632e-09
A 8 = -2.32100e-11 A 10 = 5.45548e-14

28th Surface

K = 0.00000e+00 A 4 = -1.60218e-05 A 6 = 4.08680e-08
A 8 = -1.19153e-10 A 10 = 1.38194e-13

Various Data

| | |
|---|---|
| Focal Length | 179.86 |
| F-number | 3.60 |
| Angle of View | 6.86 |
| Image Height | 21.64 |
| Overall Lens Length | 195.15 |
| BF | 17.69 |

The aberration diagram of the first tilt image-capturing and the aberration diagram of the second tilt image-capturing of Numerical Example 2 indicate FIG. 6A and FIG. 6B, respectively.

| | Infinite | Maximum Magnification | First Tilt Image-Capturing | Second Tilt Image-Capturing |
|---|---|---|---|---|
| d7 | 44.46 | 20.46 | 44.10 | 20.70 |
| d12 | 2.88 | 26.88 | 3.24 | 26.64 |
| d13 | 3.07 | 12.49 | 3.48 | 12.22 |
| d18 | 11.26 | 1.84 | 10.84 | 2.11 |
| d20 | 1.93 | 1.93 | 1.93 | 1.93 |
| d23 | 1.83 | 1.83 | 1.83 | 1.83 |
| d25 | 1.74 | 1.74 | 1.74 | 1.74 |
| d28 | 7.29 | 7.29 | 7.29 | 7.29 |
| d35 | 17.69 | 17.69 | 17.54 | 17.54 |

| | First Tilt Image-Capturing | Second Tilt Image-Capturing |
|---|---|---|
| Ma | 1.92 | 5.90 |
| Mb | 2.02 | 6.23 |

Lens Unit Data

| Unit | Starting Surface | Focal Length |
|---|---|---|
| 1 | 1 | 232.95 |
| 2 | 8 | 73.16 |
| 3 | 14 | −31.86 |
| 4 | 19 | −157.86 |
| 5 | 21 | 43.54 |
| 6 | 24 | 39.07 |
| 7 | 26 | −29.14 |
| 8 | 29 | −106.26 |

Numerical Example 3

Unit: mm

Surface Data

| Surface Number | r | d | nd | νd |
|---|---|---|---|---|
| 1 | 248.262 | 3.70 | 1.48749 | 70.2 |
| 2 | 1040.268 | 0.16 | | |
| 3 | 89.135 | 9.61 | 1.49700 | 81.5 |
| 4 | −466.470 | 0.16 | | |
| 5 | 76.591 | 10.21 | 1.49700 | 81.5 |
| 6 | −256.118 | 5.43 | 1.77633 | 50.0 |
| 7 | 161.387 | 23.04 | | |
| 8 | 46.441 | 1.97 | 1.87912 | 39.4 |
| 9 | 29.971 | 7.12 | 1.49626 | 82.2 |
| 10 | 256.375 | 2.53 | | |
| 11 (aperture) | ∞ | (variable) | | |
| 12 | 5386.597 | 1.77 | 1.84051 | 31.4 |
| 13 | 40.149 | 3.39 | | |
| 14 | −179.195 | 1.77 | 1.85486 | 41.9 |
| 15 | 43.546 | 4.34 | 1.91994 | 19.0 |
| 16 | 3763.832 | (variable) | | |
| 17 | 169.526 | 7.19 | 1.92302 | 18.9 |
| 18 | 68.493 | 1.91 | | |
| 19 | 62.961 | 6.27 | 1.58313 | 59.4 |
| 20* | −57.081 | 1.87 | | |
| 21* | 40.089 | 5.73 | 1.49700 | 81.5 |
| 22* | −65.762 | 1.72 | | |
| 23 | −96.550 | 1.81 | 1.58313 | 59.4 |
| 24* | 32.706 | 6.19 | | |
| 25 | −53.257 | 1.99 | 1.49691 | 81.7 |
| 26 | 80.104 | 2.95 | | |
| 27 | 273.792 | 10.01 | 1.56045 | 44.6 |
| 28 | −33.197 | 6.36 | | |
| 29 | −31.476 | 2.00 | 1.49670 | 81.9 |
| 30 | 103.437 | 0.13 | | |
| 31 | 45.287 | 6.83 | 1.51332 | 56.3 |
| 32 | −275.551 | 26.48 | | |
| Image Plane | ∞ | | | |

Aspherical Data

20th Surface

K = 0.00000e+00 A 4 = 3.65690e−06 A 6 = −4.01390e−09
A 8 = 3.99705e−12 A 10 = −3.36245e−16

21st Surface

K = 0.00000e+00 A 4 = 1.23010e−06 A 6 = 1.30868e−08
A 8 = −8.01089e−11 A 10 = 2.13661e−13

22nd Surface

K = 0.00000e+00 A 4 = 6.54254e−07 A 6 = 1.19822e−08
A 8 = −6.86727e−11 A 10 = 1.78656e−13

24th Surface

K = 0.00000e+00 A 4 = −1.78967e−06 A 6 = 1.24701e−08
A 8 = −4.27471e−11 A 10 = 9.31861e−14

Unit: mm

Various Data

| | |
|---|---|
| Focal Length | 193.86 |
| F-number | 2.88 |
| Angle of View | 6.37 |
| Image Height | 21.64 |
| Overall Lens Length | 182.73 |
| BF | 26.48 |

The aberration diagram of the first tilt image-capturing and the aberration diagram of the second tilt image-capturing of Numerical Example 3 indicate FIG. 9A and FIG. 9B, respectively.

| | Infinite | Maximum Magnification | First Tilt Image-Capturing | Second Tilt Image-Capturing |
|---|---|---|---|---|
| d11 | 2.88 | 15.44 | 3.63 | 15.66 |
| d16 | 15.23 | 2.66 | 14.47 | 2.44 |
| d18 | 1.91 | 1.91 | 1.91 | 1.91 |
| d20 | 1.87 | 1.87 | 1.87 | 1.87 |
| d22 | 1.72 | 1.72 | 1.72 | 1.72 |
| d24 | 6.19 | 6.19 | 6.19 | 6.19 |
| d32 | 26.48 | 26.48 | 26.48 | 26.48 |

| | First Tilt Image-Capturing | Second Tilt Image-Capturing |
|---|---|---|
| Ma | 3.40 | 3.62 |
| Mb | 3.65 | 3.88 |

Zoom Lens Unit Data

| Unit | Starting Surface | Focal Length |
|---|---|---|
| 1 | 1 | 81.09 |
| 2 | 12 | −40.77 |
| 3 | 17 | −128.92 |
| 4 | 19 | 52.35 |
| 5 | 21 | 51.03 |
| 6 | 23 | −41.68 |
| 7 | 25 | −476.12 |

Numerical Example 4

Unit: mm

Surface Data

| Surface Number | r | d | nd | νd |
|---|---|---|---|---|
| 1 | −87.304 | 1.89 | 1.90018 | 37.5 |
| 2 | 31.676 | 14.23 | 1.65589 | 33.4 |
| 3 | −88.869 | 0.10 | | |
| 4 | 200.218 | 4.12 | 1.84891 | 24.0 |
| 5 | −176.528 | 6.83 | | |
| 6 | 60.718 | 9.67 | 1.49674 | 81.7 |
| 7 | −52.644 | −0.03 | | |
| 8 | −119.201 | 1.81 | 1.65882 | 33.2 |
| 9 | 37.467 | 3.04 | | |
| 10 | 102.722 | 1.78 | 1.84676 | 23.8 |
| 11 | 49.442 | 5.65 | 1.62499 | 64.4 |
| 12 | −314.146 | 0.20 | | |
| 13 | 40.889 | 6.40 | 1.73134 | 54.5 |
| 14 | −247.204 | 2.82 | | |
| 15 (aperture) | ∞ | (variable) | | |
| 16 | −108.719 | 0.79 | 1.90060 | 37.4 |
| 17 | 39.919 | 3.05 | | |
| 18 | −533.007 | 1.22 | 1.91521 | 32.1 |

-continued

| Unit: mm | | | | |
|---|---|---|---|---|
| 19 | 36.279 | 5.43 | 1.92286 | 18.9 |
| 20 | -171.574 | (variable) | | |
| 21 | 89.651 | 1.69 | 1.92292 | 19.3 |
| 22 | 44.378 | 2.87 | | |
| 23* | 103.849 | 4.96 | 1.58313 | 59.4 |
| 24* | -65.886 | 1.49 | | |
| 25 | 124.749 | 5.76 | 1.73746 | 53.9 |
| 26 | -51.253 | 9.98 | | |
| 27 | -377.683 | 4.47 | 1.90053 | 37.4 |
| 28 | 51.355 | 7.26 | 1.60145 | 39.0 |
| 29 | -33.786 | 1.61 | | |
| 30* | -40.284 | 1.19 | 1.58313 | 59.4 |
| 31* | 33.956 | (variable) | | |
| 32 | -26.018 | 7.46 | 1.81625 | 46.6 |
| 33 | -53.874 | -0.06 | | |
| 34 | 62.385 | 5.92 | 1.49670 | 81.9 |
| 35 | -118.740 | (variable) | | |
| 36 | 735.319 | 1.83 | 1.70004 | 30.1 |
| 37 | 112.303 | 14.71 | | |
| Image Plane | ∞ | | | |

Aspherical Data

23rd Surface

K = 0.00000e+00 A 4 = 1.42671e-06 A 6 = 4.18018e-09
A 8 = 1.15895e-12 A 10 = 5.19331e-15

24th Surface

K = 0.00000e+00 A 4 = 1.75596e-06 A 6 = 4.29665e-09
A 8 = -3.88295e-12 A 10 = 1.80763e-14

30th Surface

K = 0.00000e+00 A 4 = -8.56454e-06 A 6 = 7.60633e-08
A 8 = -3.68738e-10 A 10 = 5.42586e-13

31st Surface

K = 0.00000e+00 A 4 = -6.48869e-06 A 6 = 7.22512e-08
A 8 = -3.07607e-10 A 10 = 4.08475e-13

Various Data

| Focal Length | 97.23 |
|---|---|
| F-number | 2.88 |
| Angle of View | 12.54 |
| Image Height | 21.64 |
| Overall Lens Length | 176.52 |
| BF | 14.71 |

The aberration diagram of the first tilt image-capturing and the aberration diagram of the second tilt image-capturing of Numerical Example 4 indicate FIG. 12A and FIG. 12B, respectively.

| | Infinite | Maximum Magnification | First Tilt Image-Capturing | Second Tilt Image-Capturing |
|---|---|---|---|---|
| d15 | 3.63 | 20.17 | 3.91 | 19.94 |
| d20 | 18.25 | 1.70 | 17.97 | 1.94 |
| d22 | 2.87 | 2.87 | 2.87 | 2.87 |
| d24 | 1.49 | 1.49 | 1.49 | 1.49 |
| d29 | 1.61 | 1.61 | 1.61 | 1.61 |
| d31 | 7.79 | 12.78 | 8.47 | 10.78 |
| d35 | 6.71 | 1.72 | 6.03 | 3.72 |
| d37 | 14.71 | 14.71 | 14.71 | 14.71 |

Zoom Lens Unit Data

| Unit | Starting Surface | Focal Length |
|---|---|---|
| 1 | 1 | 40.42 |
| 2 | 16 | -38.37 |
| 3 | 21 | -96.96 |
| 4 | 23 | 69.88 |
| 5 | 25 | 38.64 |
| 6 | 30 | -31.41 |
| 7 | 32 | -2080.36 |
| 8 | 36 | -189.57 |

| | First Tilt Image-Capturing | Second Tilt Image-Capturing |
|---|---|---|
| Ma | 2.22 | 3.37 |
| Mb | 2.12 | 3.18 |

Numerical Example 5

| Unit: mm | | | | |
|---|---|---|---|---|
| Surface Data | | | | |
| Surface Number | r | d | nd | vd |
| 1 | -45.764 | 4.45 | 1.90061 | 37.4 |
| 2 | 48.352 | 7.05 | 1.84667 | 23.8 |
| 3 | 95.755 | 1.29 | | |
| 4 | 93.722 | 5.94 | 1.75815 | 51.7 |
| 5 | -96.642 | 0.11 | | |
| 6 | 2265.562 | 4.85 | 1.49689 | 81.6 |
| 7 | -49.411 | 0.08 | | |
| 8 | 119.258 | 1.90 | 1.56124 | 46.7 |
| 9 | 40.472 | 2.17 | | |
| 10 | 100.441 | 1.92 | 1.87539 | 26.5 |
| 11 | 43.591 | 5.96 | 1.62831 | 64.0 |
| 12 | -140.854 | 0.20 | | |
| 13 | 44.123 | 4.85 | 1.81643 | 46.6 |
| 14 | -5194.885 | 2.93 | | |
| 15 (aperture) | ∞ | (variable) | | |
| 16 | 565.913 | 1.85 | 1.66816 | 59.8 |
| 17 | 32.802 | 4.08 | | |
| 18 | -93.004 | 1.96 | 1.69895 | 30.1 |
| 19 | 42.701 | 7.00 | 1.92322 | 18.9 |
| 20 | -128.791 | (variable) | | |
| 21 | -81.578 | 4.45 | 1.85264 | 23.4 |
| 22 | 73.624 | 1.93 | | |
| 23* | 75.367 | 5.31 | 1.58313 | 59.4 |
| 24* | -65.208 | 5.31 | | |
| 25* | 70.409 | 8.58 | 1.58313 | 59.4 |
| 26* | -45.942 | 1.97 | | |
| 27* | -43.449 | 1.91 | 1.58313 | 59.4 |
| 28* | 234.483 | (variable) | | |
| 29 | 126.223 | 4.06 | 1.58682 | 40.8 |
| 30 | -133.290 | 0.12 | | |
| 31 | 67.398 | 6.53 | 1.49674 | 81.6 |
| 32 | -59.104 | 1.62 | 1.77332 | 26.5 |
| 33 | -297.679 | (variable) | | |
| 34 | -93.896 | 3.89 | 1.84664 | 23.8 |
| 35 | -42.064 | 1.95 | 1.79584 | 48.3 |
| 36 | 69.704 | 28.19 | | |
| Image Plane | ∞ | | | |

Aspherical Data

23rd Surface

K = 0.00000e+00 A 4 = 1.11099e-06 A 6 = -7.29024e-09
A 8 = 4.55355e-11 A 10 = -4.80346e-14

24th Surface

K = 0.00000e+00 A 4 = -4.92123e-06 A 6 = -3.26667e-09
A 8 = 4.29777e-11 A 10 = -4.54461e-14

25th Surface

K = 0.00000e+00 A 4 = 9.62743e-07 A 6 = 2.46457e-09
A 8 = -1.40208e-11 A 10 = 3.68058e-14

-continued

Unit: mm

26th Surface

K = 0.00000e+00 A 4 = 8.94948e-07 A 6 = 2.56214e-09
A 8 = -1.02963e-11 A 10 = 2.94297e-14

27th Surface

K = 0.00000e+00 A 4 = -1.09391e-07 A 6 = 1.89244e-08
A 8 = -2.42908e-11 A 10 = -3.62793e-14

28th Surface

K = 0.00000e+00 A 4 = 5.11595e-06 A 6 = 1.68284e-08
A 8 = -3.73237e-11 A 10 = 1.67514e-15

Various Data

| | |
|---|---|
| Focal Length | 89.85 |
| F-number | 3.50 |
| Angle of View | 13.54 |
| Image Height | 21.64 |
| Overall Lens Length | 184.06 |
| BF | 28.19 |

The aberration diagram of the first tilt image-capturing and the aberration diagram of the second tilt image-capturing of Numerical Example 5 indicate FIG. 15A and FIG. 15B, respectively.

| | Infinite | Maximum Magnification | First Tilt Image-Capturing | Second Tilt Image-Capturing |
|---|---|---|---|---|
| d15 | 2.87 | 15.87 | 3.05 | 14.76 |
| d20 | 16.88 | 3.88 | 16.69 | 4.98 |
| d22 | 1.93 | 1.93 | 1.93 | 1.93 |
| d24 | 5.31 | 5.31 | 5.31 | 5.31 |
| d26 | 1.97 | 1.97 | 1.97 | 1.97 |
| d28 | 26.95 | 1.95 | 26.44 | 3.67 |
| d33 | 2.95 | 27.95 | 3.46 | 26.23 |
| d36 | 28.19 | 28.19 | 28.19 | 28.19 |

| | First Tilt Image-Capturing | Second Tilt Image-Capturing |
|---|---|---|
| Ma | 2.43 | 4.02 |
| Mb | 2.94 | 4.40 |

Zoom Lens Unit Data

| Unit | Starting Surface | Focal Length |
|---|---|---|
| 1 | 1 | 41.51 |
| 2 | 16 | -77.33 |
| 3 | 21 | -44.80 |
| 4 | 23 | 60.80 |
| 5 | 25 | 49.01 |
| 6 | 27 | -62.70 |
| 7 | 29 | 69.74 |
| 8 | 34 | -51.24 |

Numerical Example 6

Unit: mm

Surface Data

| Surface Number | r | d | nd | vd |
|---|---|---|---|---|
| 1 | 137.765 | 5.14 | 1.48749 | 70.2 |
| 2 | -281.582 | 0.13 | | |
| 3 | 91.383 | 4.03 | 1.85045 | 24.1 |
| 4 | 265.043 | 0.13 | | |
| 5 | 55.834 | 6.98 | 1.49590 | 82.3 |
| 6 | -803.214 | 1.87 | 1.90057 | 37.4 |
| 7 | 45.295 | (variable) | | |
| 8 | 61.343 | 5.09 | 1.49626 | 81.9 |
| 9 | -191.306 | 0.20 | | |
| 10 | 63.177 | 1.38 | 1.65679 | 33.4 |
| 11 | 35.567 | 4.89 | 1.49594 | 82.2 |
| 12 | 1015.441 | (variable) | | |
| 13 (aperture) | ∞ | 2.97 | | |
| 14 | -441.273 | 1.82 | 1.87270 | 40.0 |
| 15 | 45.301 | 2.93 | | |
| 16 | -86.856 | 1.92 | 1.55060 | 73.5 |
| 17 | 59.078 | 2.34 | 1.92307 | 18.9 |
| 18 | 91.530 | 2.76 | | |
| 19* | 132.865 | 5.52 | 1.58313 | 59.4 |
| 20* | -45.861 | 5.21 | | |
| 21* | 41.795 | 5.23 | 1.49700 | 81.5 |
| 22* | -49.974 | 1.73 | | |
| 23* | -53.451 | 1.68 | 1.58313 | 59.4 |
| 24* | 171.716 | (variable) | | |
| 25 | -715.192 | 3.55 | 1.72815 | 54.8 |
| 26 | -37.815 | 1.69 | 1.49686 | 81.8 |
| 27 | 29.514 | 3.67 | | |
| 28 | -74.124 | 1.95 | 1.49677 | 81.8 |
| 29 | 96.840 | (variable) | | |
| 30 | 47.841 | 5.82 | 1.50014 | 75.0 |
| 31 | 2136.195 | 39.06 | | |
| Image Plane | ∞ | | | |

Aspherical Data

19th Surface

K = 0.00000e+00 A 4 = 1.66443e-06 A 6 = -1.27178e-08
A 8 = 8.42385e-11 A 10 = -3.46335e-13

20th Surface

K = 0.00000e+00 A 4 = -5.27117e-08 A 6 = -6.27583e-09
A 8 = 5.90998e-11 A 10 = -2.85565e-13

21st Surface

K = 0.00000e+00 A 4 = -1.00210e-06 A 6 = 5.17853e-09
A 8 = -2.89728e-11 A 10 = 6.91598e-14

22nd Surface

K = 0.00000e+00 A 4 = 4.38864e-06 A 6 = 3.76368e-09
A 8 = -2.97459e-11 A 10 = 7.92153e-14

23rd Surface

K = 0.00000e+00 A 4 = -4.34639e-06 A 6 = 6.23992e-08
A 8 = -2.59621e-10 A 10 = 4.42919e-13

24th Surface

K = 0.00000e+00 A 4 = -4.37763e-06 A 6 = 6.28060e-08
A 8 = -2.73663e-10 A 10 = 5.05780e-13

Various Data

| | |
|---|---|
| Focal Length | 179.74 |
| F-number | 3.61 |
| Angle of View | 6.86 |
| Image Height | 21.64 |
| Overall Lens Length | 203.43 |
| BF | 39.06 |

The aberration diagram of the first tilt image-capturing and the aberration diagram of the second tilt image-capturing of Numerical Example 6 indicate FIG. 18A and FIG. 18B, respectively.

|  | Infinite | Maximum Magnification | First Tilt Image-Capturing | Second Tilt Image-Capturing |
|---|---|---|---|---|
| d7 | 60.69 | 36.68 | 60.11 | 38.82 |
| d12 | 2.91 | 26.92 | 3.49 | 24.78 |
| d18 | 2.76 | 2.76 | 2.76 | 2.76 |
| d20 | 5.21 | 5.21 | 5.21 | 5.21 |
| d22 | 1.73 | 1.73 | 1.73 | 1.73 |
| d24 | 2.08 | 17.66 | 2.18 | 15.84 |
| d29 | 18.07 | 2.48 | 17.96 | 4.30 |
| d31 | 39.06 | 39.06 | 39.06 | 39.06 |

|  | First Tilt Image-Capturing | Second Tilt Image-Capturing |
|---|---|---|
| Ma | 2.40 | 5.34 |
| Mb | 3.64 | 7.63 |

Zoom Lens Unit Data

| Unit | Starting Surface | Focal Length |
|---|---|---|
| 1 | 1 | 376.27 |
| 2 | 8 | 62.69 |
| 3 | 13 | −30.83 |
| 4 | 19 | 59.14 |
| 5 | 21 | 46.68 |
| 6 | 23 | −69.71 |
| 7 | 25 | −41.52 |
| 8 | 30 | 97.76 |

Numerical Example 7

Unit: mm

Surface Data

| Surface Number | r | d | nd | vd |
|---|---|---|---|---|
| 1 | 54.285 | 4.47 | 1.49700 | 81.5 |
| 2 | 175.488 | 0.10 |  |  |
| 3 | 62.007 | 6.53 | 1.49700 | 81.5 |
| 4 | −102.174 | 1.89 | 1.52918 | 50.0 |
| 5 | 721.220 | 0.20 |  |  |
| 6 | 1038.719 | 1.87 | 1.59134 | 40.1 |
| 7 | 33.196 | 6.67 | 1.49643 | 82.3 |
| 8 | 219.015 | 2.56 |  |  |
| 9 (aperture) | ∞ | 5.01 |  |  |
| 10 | −60.570 | 1.91 | 1.51735 | 52.4 |
| 11 | −83.862 | 1.93 |  |  |
| 12 | 210.422 | 2.69 | 1.85843 | 39.7 |
| 13 | −352.528 | 4.20 |  |  |
| 14 | 56.588 | 3.79 | 1.85935 | 41.5 |
| 15 | −197.056 | 0.99 |  |  |
| 16* | −50.290 | 1.54 | 1.49700 | 81.5 |
| 17* | −75.257 | 2.24 |  |  |
| 18 | −93.444 | 2.00 | 1.60675 | 38.4 |
| 19 | 45.839 | (variable) |  |  |
| 20 | −561.937 | 1.49 | 1.73030 | 54.6 |
| 21 | 22.413 | 3.85 | 1.77873 | 26.3 |
| 22 | −58.245 | 1.33 |  |  |
| 23 | −60.248 | 1.56 | 1.88984 | 28.0 |
| 24 | 32.866 | (variable) |  |  |
| 25 | 56.197 | 1.68 | 1.84676 | 23.8 |
| 26 | 41.985 | 9.51 | 1.51290 | 79.2 |
| 27 | −60.618 | 37.11 |  |  |
| Image Plane | ∞ |  |  |  |

Aspherical Data

16th Surface

K = 0.00000e+00 A 4 = 5.80635e−05 A 6 = −1.95819e−07
A 8 = 6.45765e−10 A 10 = −1.20488e−12

-continued

Unit: mm

17th Surface

K = 0.00000e+00 A 4 = 6.03692e−05 A 6 = −1.96058e−07
A 8 = 7.21946e−10 A 10 = −1.50213e−12

Various Data

| Focal Length | 134.80 |
|---|---|
| F-number | 3.50 |
| Angle of View | 9.12 |
| Image Height | 21.64 |
| Overall Lens Length | 135.33 |
| BF | 37.11 |

The aberration diagram of the first tilt image-capturing and the aberration diagram of the second tilt image-capturing of Numerical Example 7 indicate FIG. 21A and FIG. 21B, respectively.

|  | Infinite | Maximum Magnification | First Tilt Image-Capturing | Second Tilt Image-Capturing |
|---|---|---|---|---|
| d11 | 1.93 | 1.93 | 1.93 | 1.93 |
| d13 | 4.20 | 4.20 | 4.20 | 4.20 |
| d17 | 2.24 | 2.24 | 2.24 | 2.24 |
| d19 | 3.08 | 20.98 | 3.91 | 20.78 |
| d24 | 25.14 | 7.24 | 24.31 | 7.44 |
| d27 | 37.11 | 37.11 | 37.11 | 37.11 |

|  | First Tilt Image-Capturing | Second Tilt Image-Capturing |
|---|---|---|
| Ma | 9.98 | 7.28 |
| Mb | 4.70 | 3.22 |

Zoom Lens Unit Data

| Unit | Starting Surface | Focal Length |
|---|---|---|
| 1 | 1 | 131.91 |
| 2 | 12 | 153.84 |
| 3 | 14 | 61.61 |
| 4 | 18 | −50.41 |
| 5 | 20 | −37.31 |
| 6 | 25 | 65.85 |

Numerical Example 8

Unit: mm

Surface Data

| Surface Number | r | d | nd | vd |
|---|---|---|---|---|
| 1 | 390.101 | 7.01 | 1.48749 | 70.2 |
| 2 | −109.067 | 0.18 |  |  |
| 3 | 116.523 | 7.52 | 1.49652 | 81.8 |
| 4 | −96.991 | 1.97 | 1.90063 | 37.4 |
| 5 | 831.126 | 0.19 |  |  |

-continued

Unit: mm

| | | | | |
|---|---|---|---|---|
| 6 | 106.176 | 6.64 | 1.74772 | 27.7 |
| 7 | −124.914 | 1.97 | 1.90065 | 37.3 |
| 8 | 284.827 | 6.57 | | |
| 9 | 56.798 | 1.94 | 1.82269 | 41.3 |
| 10 | 43.696 | 8.12 | | |
| 11 (aperture) | ∞ | (variable) | | |
| 12 | 53.280 | 5.18 | 1.49657 | 81.8 |
| 13 | 573.096 | 0.20 | | |
| 14 | 83.347 | 1.66 | 1.72867 | 31.6 |
| 15 | 41.846 | 4.81 | 1.49646 | 82.0 |
| 16 | −192.971 | (variable) | | |
| 17 | −114.979 | 1.79 | 1.83247 | 44.5 |
| 18 | 50.915 | 2.15 | | |
| 19 | −223.379 | 3.31 | 1.92295 | 18.9 |
| 20 | −44.681 | 1.83 | 1.81604 | 46.6 |
| 21 | 127.282 | (variable) | | |
| 22 | 77.085 | 1.94 | 1.92304 | 18.9 |
| 23 | 44.719 | 3.40 | | |
| 24 | 103.431 | 5.56 | 1.58313 | 59.4 |
| 25* | −48.136 | 1.90 | | |
| 26 | 54.356 | 7.37 | 1.51182 | 79.1 |
| 27 | −52.471 | 6.13 | | |
| 28 | 96.467 | 4.64 | 1.67561 | 37.6 |
| 29 | −81.492 | 1.83 | | |
| 30 | −452.895 | 1.96 | 1.75157 | 52.4 |
| 31 | 34.783 | 3.03 | | |
| 32 | −129.503 | 1.90 | 1.58313 | 59.4 |
| 33* | 1706.616 | 2.00 | | |
| 34 | 399.529 | 1.97 | 1.92299 | 18.9 |
| 35 | 45.522 | 5.72 | | |
| 36 | −53.165 | 5.21 | 1.88389 | 20.4 |
| 37 | −25.000 | 3.72 | 1.72881 | 54.7 |
| 38 | −859.778 | 2.84 | | |
| 39 | 41.728 | 5.97 | 1.50919 | 61.2 |
| 40 | 491.906 | (variable) | | |
| Image Plane | ∞ | | | |

Aspherical Data

25th Surface

K = 0.00000e+00 A 4 = 2.25167e−06 A 6 = −7.24813e−10

33rd Surface

K = 0.00000e+00 A 4 = 6.25777e−06 A 6 = 8.45846e−09
A 8 = 1.75823e−11 A 10 = −8.69122e−16

-continued

Unit: mm

Various Data

| | |
|---|---|
| Focal Length | 179.93 |
| F-number | 3.60 |
| Angle of View | 6.86 |
| Image Height | 21.64 |
| Overall Lens Length | 202.90 |
| BF | 31.10 |

The aberration diagram of the first tilt image-capturing and the aberration diagram of the second tilt image-capturing of Numerical Example 8 indicate FIG. 24A and FIG. 24B, respectively.

| | Infinite | Maximum Magnification | First Tilt Image-Capturing | Second Tilt Image-Capturing |
|---|---|---|---|---|
| d11 | 29.94 | 5.94 | 29.44 | 8.07 |
| d16 | 3.22 | 32.99 | 3.92 | 31.71 |
| d21 | 8.49 | 2.72 | 8.28 | 1.86 |
| d23 | 3.40 | 3.40 | 3.40 | 3.40 |
| d25 | 1.90 | 1.90 | 1.90 | 1.90 |
| d29 | 1.83 | 1.83 | 1.83 | 1.83 |
| d33 | 2.00 | 2.00 | 2.00 | 2.00 |
| d40 | 31.10 | 31.10 | 31.00 | 31.00 |

| | First Tilt Image-Capturing | Second Tilt Image-Capturing |
|---|---|---|
| Ma | 1.55 | 4.79 |
| Mb | 1.65 | 5.35 |

Zoom Lens Unit Data

| Unit | Starting Surface | Focal Length |
|---|---|---|
| 1 | 1 | 223.22 |
| 2 | 12 | 71.41 |
| 3 | 17 | −30.59 |
| 4 | 22 | −118.81 |
| 5 | 24 | 57.10 |
| 6 | 26 | 32.26 |
| 7 | 30 | −35.07 |
| 8 | 34 | −78.35 |

TABLE 1

| | Inequality | Ex. 1 | Ex. 2 | Ex. 3 | Ex. 4 | Ex. 5 | Ex. 6 | Ex. 7 | Ex. 8 |
|---|---|---|---|---|---|---|---|---|---|
| (1) | $Ma_{max}/Mc_{max}$ | 0.74 | 0.95 | 0.93 | 1.06 | 0.91 | 0.70 | 2.12 | 0.90 |
| (2) | fa/f | 0.23 | 0.24 | 0.27 | 0.72 | 0.68 | 0.33 | 1.14 | 0.32 |
| (3) | fc/f | −0.23 | −0.16 | −0.21 | −0.32 | −0.70 | −0.39 | −0.37 | −0.19 |
| (4) | $|Pa| + |Pc|$ | 5.48 | 6.57 | 5.31 | 2.83 | 1.85 | 3.57 | 2.13 | 4.96 |
| (5) | Lbk/f | 0.15 | 0.10 | 0.14 | 0.15 | 0.31 | 0.22 | 0.28 | 0.17 |
| (6) | f/fb | 4.13 | 4.60 | 3.80 | 2.52 | 1.83 | 3.85 | 2.19 | 5.58 |
| (7) | β | −1.00 | −0.99 | −0.34 | −0.97 | −0.99 | −0.98 | −0.35 | −1.00 |
| (8) | $|Ma_{max}/fa|$ | 0.13 | 0.14 | 0.07 | 0.05 | 0.07 | 0.09 | 0.06 | 0.08 |
| (9) | $|Mc_{max}/fc|$ | 0.18 | 0.21 | 0.09 | 0.10 | 0.07 | 0.11 | 0.09 | 0.15 |
| (10) | (Rfa + Rra)/(Rra − Rfa) | −0.23 | −0.39 | −0.05 | −0.22 | −0.07 | −0.49 | 0.25 | −0.36 |
| (11) | (Rfc + Rrc)/(Rrc − Rfc) | −0.65 | −0.50 | −0.49 | −0.09 | 0.69 | 0.53 | −0.34 | 0.58 |
| (12) | mLf2/mLf1 | −0.40 | −0.39 | — | −0.30 | −1.92 | −0.65 | — | — |

While the Examples and the exemplary embodiment of the disclosure are described above, the disclosure is not limited to those, and can be modified and changed in various manners within the scope of the spirit thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-073276, filed Apr. 27, 2022, which is hereby incorporated by reference herein in its entirety.

What is claimed is:

1. An optical system configured to perform tilt image-capturing, the optical system comprising:
    an object-side lens unit, a first lens unit having a positive refractive power, a second lens unit having a positive refractive power, and a third lens unit having a negative refractive power which are arranged in order from an object side,
    wherein the first lens unit and the third lens unit move in a direction including a component of a direction perpendicular to an optical axis for tilt image-capturing, and
    wherein the object-side lens unit and the second lens unit do not move in a direction including a component of a direction perpendicular to the optical axis for tilt image-capturing, and
    wherein the following inequality is satisfied:

$0.01 < |Ma_{max}/fa| < 0.30$, where $Ma_{max}$ is a maximum movement amount of the first lens unit in the direction perpendicular to the optical axis, and fa is a focal length of the first lens unit.

2. The optical system according to claim 1, wherein the following inequality is satisfied:

$Ma_{max}/Mc_{max} > 0$, where $Ma_{max}$ is a maximum movement amount of the first lens unit in the direction perpendicular to the optical axis, and $Mc_{max}$ is a maximum movement amount of the third lens unit in the direction perpendicular to the optical axis.

3. The optical system according to claim 1, wherein the following inequality is satisfied:

$-2.00 < fc/f < -0.05$, where f is a focal length of the optical system, and fc is a focal length of the third lens unit.

4. The optical system according to claim 1, wherein the following inequality is satisfied:

$0.05 < fa/f < 2.00$, where f is a focal length of the optical system, and fa is a focal length of the first lens unit.

5. The optical system according to claim 1, wherein the object-side lens unit has a positive refractive power.

6. The optical system according to claim 1, wherein the following inequality is satisfied:

$0.4 < |Pa| + |Pc| < 12.0$, where Pa is a Petzval sum of the first lens unit, and Pc is a Petzval sum of the third lens unit.

7. The optical system according to claim 1, wherein the following inequality is satisfied:

$0 < Lbk/f < 0.65$, where f is a focal length of the optical system, and Lbk is a back focus of the optical system.

8. The optical system according to claim 1, wherein the following inequality is satisfied:

$0.5 < f/fb < 10.0$, where f is a focal length of the optical system, and fb is a focal length of the second lens unit.

9. The optical system according to claim 1, wherein the following inequality is satisfied:

$\beta < -0.25$ where $\beta$ is a lateral magnification at a time of closest focus of the optical system.

10. The optical system according to claim 1, wherein the following inequality is satisfied:

$0.01 < |Mc_{max}/fc| < 0.30$, where $Mc_{max}$ is a maximum movement amount in the direction perpendicular to the optical axis of the third lens unit, and fc is a focal length of the third lens unit.

11. The optical system according to claim 1, wherein the following inequality is satisfied:

$-0.8 < (Rfa+Rra)/(Rra-Rfa) < 0.8$, where Rfa is a paraxial curvature radius of an object-side lens surface of a lens closest to an object in the first lens unit, and Rra is a paraxial curvature radius of an image-side lens surface of a lens closest to an image plane in the first lens unit.

12. The optical system according to claim 1, wherein the following inequality is satisfied:

$-0.8 < (Rfc+Rrc)/(Rrc-Rfc) < 0.8$, where Rfc is a paraxial curvature radius of an object-side lens surface of a lens closest to an object in the third lens unit, and Rrc is a paraxial curvature radius of an image-side lens surface of a lens closest to an image plane in the third lens unit.

13. The optical system according to claim 1,
    wherein the object-side lens unit includes a first focusing unit, and
    wherein the first focusing unit moves in an optical axis direction for focusing.

14. The optical system according to claim 13, further comprising a second focusing unit on an image side of the first focusing unit and configured to move in the optical axis direction for focusing, wherein a moving direction of the first focusing unit in focusing from an infinite distance to a closest distance and a moving direction of the second focusing unit in focusing from an infinite distance to a closest distance are opposite directions.

15. The optical system according to claim 14, wherein the following inequality is satisfied:

$-3.00 < mLf2/mLf1 < -0.10$ where mLf1 is a movement amount of the first focusing unit in focusing from the infinite distance to the closest distance, and mLf2 is a movement amount of the second focusing unit in focusing from the infinite distance to the closest distance.

16. An apparatus comprising:
    an optical system; and
    an image sensor configured to receive light of an image formed by the optical system,
    wherein the optical system configured to perform tilt image-capturing, wherein the optical system comprising:

an object-side lens unit, a first lens unit having a positive refractive power, a second lens unit having a positive refractive power, and a third lens unit having a negative refractive power which are arranged in order from an object side, wherein the first lens unit and the third lens unit move in a direction including a component of a direction perpendicular to an optical axis for tilt image-capturing, wherein the object-side lens unit and the second lens unit do not move in a direction including a component of a direction perpendicular to the optical axis for tilt image-capturing, and wherein the following inequality is satisfied:

$$0.01 < |Ma_{max}/fa| < 0.30,$$

where $Ma_{max}$ is a maximum movement amount of the first lens unit in the direction perpendicular to the optical axis, and fa is a focal length of the first lens unit.

17. The apparatus according to claim 16, wherein the following inequality is satisfied:

$$Ma_{max}/Mc_{max} > 0,$$

where $Ma_{max}$ is a maximum movement amount of the first lens unit in the direction perpendicular to the axis, and $Mc_{max}$ is a maximum movement amount of the third lens unit in the direction perpendicular to the axis.

18. The apparatus according to claim 16, wherein the following inequality is satisfied:

$$0.05 < fa/f < 2.00,$$

where f is a focal length of the optical system, and fa is a focal length of the first lens unit.

19. The apparatus according to claim 16, wherein the following inequality is satisfied:

$$-2.00 < fc/f < -0.05,$$

where f is a focal length of the optical system, and fc is a focal length of the third lens unit.

20. An optical system configured to perform tilt image-capturing, the optical system comprising: an object-side lens unit, a first lens unit having a positive refractive power, a second lens unit having a positive refractive power, and a third lens unit having a negative refractive power which are arranged in order from an object side, wherein the first lens unit and the third lens unit move in a direction including a component of a direction perpendicular to an optical axis for tilt image-capturing, wherein the object-side lens unit and the second lens unit do not move in a direction including a component of a direction perpendicular to the optical axis for tilt image-capturing, and wherein the following inequality is satisfied: $0.01 < |Mc_{max}/fc| < 0.30$, where $Mc_{max}$ is a maximum movement amount in the direction perpendicular to the optical axis of the third lens unit, and fc is a focal length of the third lens unit.

* * * * *